(12) United States Patent
Ishii

(10) Patent No.: US 6,781,334 B2
(45) Date of Patent: Aug. 24, 2004

(54) MOTOR CONTROLLER AND CONTROL METHOD THEREOF

(75) Inventor: Hiroshi Ishii, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 29 days.

(21) Appl. No.: 10/145,907

(22) Filed: May 16, 2002

(65) Prior Publication Data

US 2002/0195979 A1 Dec. 26, 2002

(30) Foreign Application Priority Data

Jun. 20, 2001 (JP) ......................................... 2001-186223
Jun. 21, 2001 (JP) ......................................... 2001-187580

(51) Int. Cl.[7] ................................................ H02P 7/00
(52) U.S. Cl. ......................... 318/432; 318/700; 318/720
(58) Field of Search ................................ 318/254, 138, 318/439, 720, 721, 722, 723, 724, 432, 807, 808, 809, 810, 811

(56) References Cited

U.S. PATENT DOCUMENTS

| | | | |
|---|---|---|---|
| 4,051,420 A | * | 9/1977 | Tanikoshi .................... 318/254 |
| 4,565,956 A | * | 1/1986 | Zimmermann et al. ..... 318/721 |
| 4,827,196 A | * | 5/1989 | Odell .......................... 318/254 |
| 5,428,276 A | | 6/1995 | Carobolante et al. |
| 5,510,683 A | | 4/1996 | Omi et al. |
| 6,051,946 A | | 4/2000 | Yamada et al. |
| 6,362,581 B1 | * | 3/2002 | Matsushiro et al. ......... 318/254 |
| 6,495,980 B2 | * | 12/2002 | Cho et al. .................... 318/254 |
| 6,577,092 B2 | * | 6/2003 | Okai ........................... 318/560 |

FOREIGN PATENT DOCUMENTS

| | | | | |
|---|---|---|---|---|
| JP | 60051491 A | * | 3/1985 | ............. H02P/6/02 |
| JP | 9-74790 | | 3/1997 | |
| WO | WO 96/10863 | | 4/1996 | |

* cited by examiner

Primary Examiner—Robert Nappi
Assistant Examiner—Eduardo Colon Santana
(74) Attorney, Agent, or Firm—Foley & Lardner LLP

(57) ABSTRACT

A control device which controls the current supplied to a motor (1) comprises a phase sensor (2) which detects a rotor phase of the motor (1) at a predetermined angular resolution, and outputs a phase signal corresponding to plural phase determining ranges, a motor drive device (4, 5), and a controller (3). The controller (3) selects one method from plural different methods which determine a current control rotor phase from the phase signal, computes the current control rotor phase from the phase signal using the selected method, computes a command value of the current supplied to the motor (1) using the computed current control rotor phase, and outputs this to the motor drive device (4, 5).

18 Claims, 22 Drawing Sheets

MOTOR CONTROLLER AND CONTROL METHOD THEREOF

FIELD OF THE INVENTION

This invention relates to a motor controller and control method.

BACKGROUND OF THE INVENTION

When controlling the rotation of a brushless motor such as a permanent magnet type synchronous motor, a sensor is required which detects a rotor phase because the current led to a stator coil is controlled according to a rotation angular position of the rotor (rotor phase).

One example of such a sensor is a resolver which has a high resolving power. However, since the resolver is expensive, a more economical sensor is desired even if its resolving power is low.

In the controller disclosed by JP-A-H9-74790 published in 1997 by the Japanese Patent Office, the resolving power of the sensor is decreased to an electrical angle of 60 degrees, and finer rotor phase are detected by performing an interpolation computation.

SUMMARY OF THE INVENTION

However, to perform this interpolation of rotor phase, the rotor must rotate above a certain speed. Therefore, during startup when the rotor rotation speed is zero or at very low rotation speeds, the correct rotor phase is not obtained, so it is impossible to control the current supplied to the motor to the optimum level, and the torque of the motor decreases.

It is therefore an object of this invention to obtain sufficient motor torque even when the motor starts or when it is rotating at low speed, by changing over the mode of current supply to the motor.

It is a further object of this invention to suppress a sudden change of motor torque when the control mode is changed.

In order to achieve above object, this invention provides a control device for controlling current supplied to a motor, comprising a phase sensor which detects a rotor phase of the motor at a predetermined angular resolution, and outputs a phase signal corresponding to plural phase determination ranges, a drive device which drives the motor, and a controller.

The controller functions to select one method from plural methods for determining a current control rotor phase from the phase signal, determine the current control rotor phase from the phase signals using the selected method, compute a command value of the current supplied to the motor using the determined current control rotor phase, and output the command value of the current to the drive device.

The details as well as other features and advantages of this invention are set forth in the remainder of the specification and are shown in the accompanying drawings.

DESCRIPTION OF THE PREFERRED EMBODIMENTS

Figure 1:
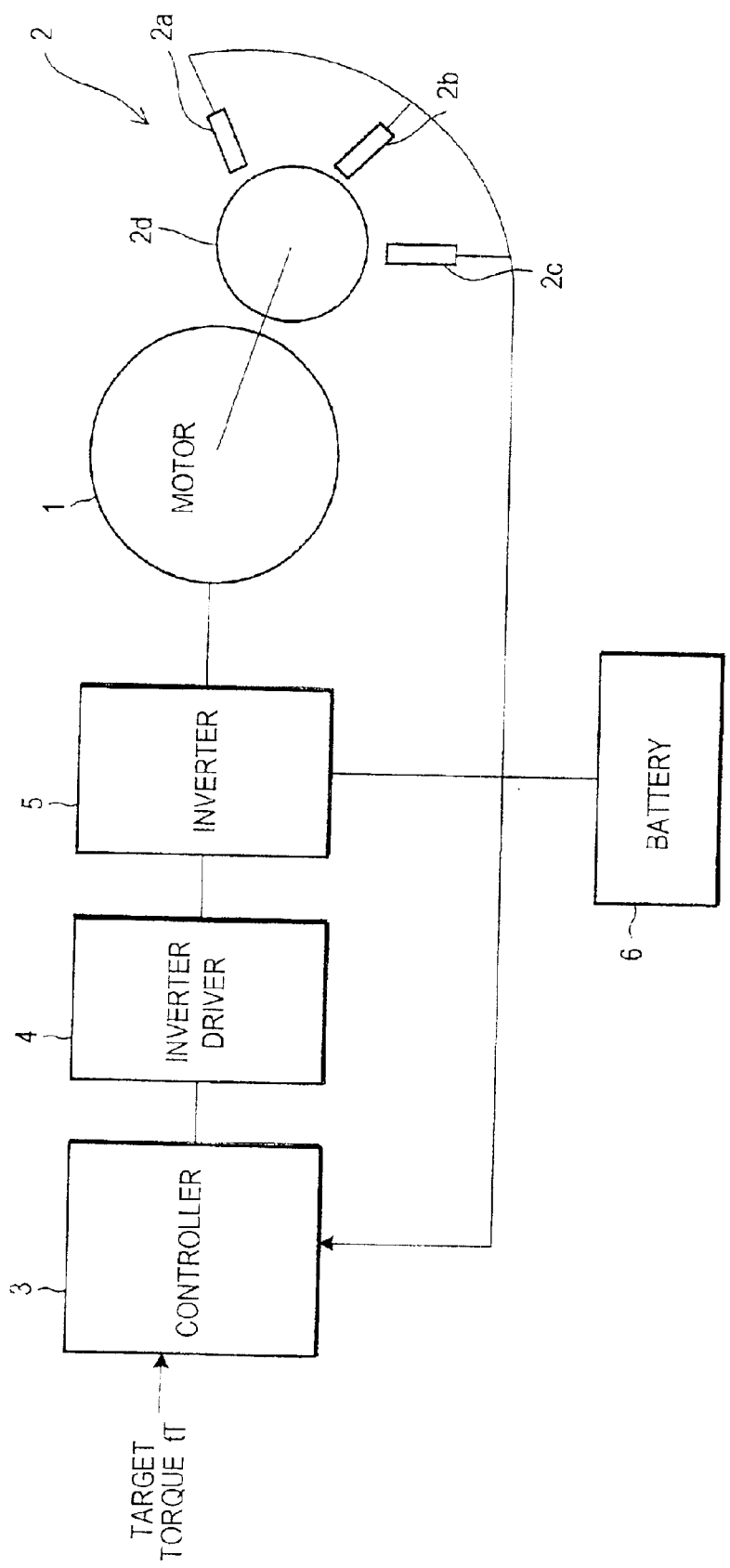
FIG. 1 is a schematic block diagram of a motor control system relating to this invention.

Referring to FIG. 1 of the drawings, a motor control system related to this invention is provided with an internal magnet type synchronous motor 1, a rotation sensor (phase detector) 2 which detects a rotor phase of the motor 1, a controller 3, an inverter driver 4, an inverter 5 and a battery 6. The phase detector 2 includes a first hall device 2a, second hall device 2b, third hall device 2c, and a magnetized disk 2d attached to the rotor of the motor 1 so that it has the poles corresponding to the poles of the rotor.

The controller 3 is connected to the motor 1 via the inverter driver 4 and inverter 5, and the battery 6 is connected to the inverter 5. The controller 3 comprises a RAM, ROM, I/O interface and one, two or more microprocessors.

Figure 2:
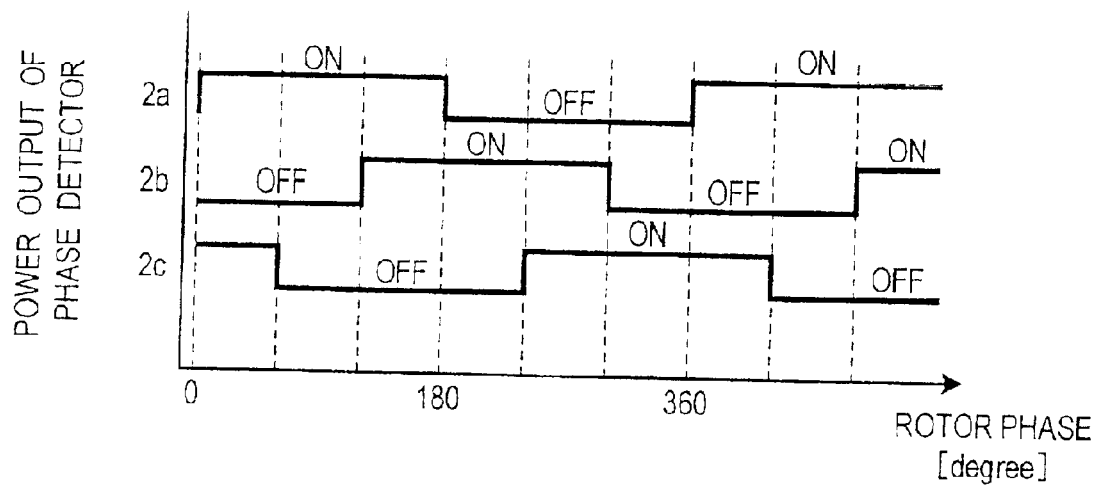
FIG. 2 is a drawing showing a relation between a rotor phase and power output of a phase detector.

The hall devices 2a–2c of the phase detector 2 output an on-off signal as shown in FIG. 2 according to the rotor phase of the motor 1, respectively. From the signal combinations, the rotor phase of the motor 1 can be detected with a resolving power of 60 electrical angles. For example, when the first hall device 2a is ON, the second hall device 2b is ON and the third hall device 2c is OFF, the rotor phase of the motor 1 is in the 120 to 180 degrees range.

Figure 3:
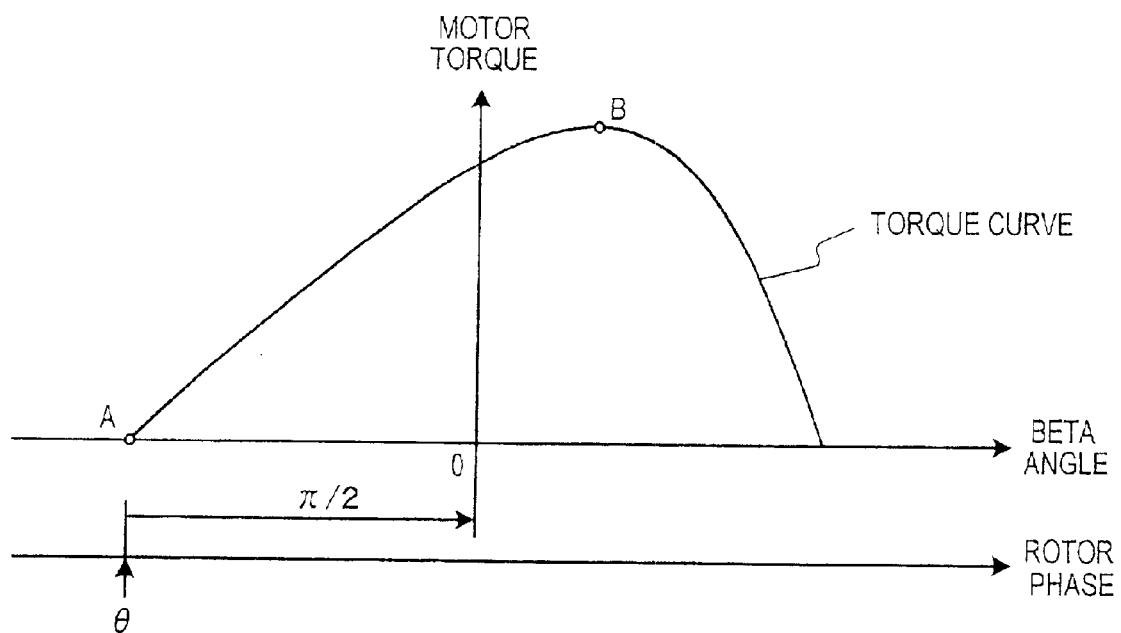
FIG. 3 is a characteristic drawing showing a relation between a beta angle and motor torque.

The torque characteristics of the motor 1 are shown in FIG. 3. When the rotor phase of the motor 1 and phase of the rotating magnetic field generated by the stator coincide, the rotor torque is zero (A in the figure). If the phase of a rotating magnetic field is advanced from the point A, the motor torque will increase and becomes a maximum at a point B in the figure. If the phase of the rotating magnetic field is further advanced from the point B, the torque decreases. This torque characteristic (torque curve) is basically determined according to the dimensions of the motor 1, and varies with the running conditions (rotation speed etc.) of the motor.

In general, when the rotating magnetic field phase is advanced by about $\pi/2$ from the rotor phase, the maximum torque is obtained, so taking the state where the rotating magnetic field phase is advanced by $\pi/2$ as the basic angle, the rotating magnetic field phase is expressed as an offset angle (beta angle) from the basic angle. This concept will be assumed in the following discussion.

Figure 4:
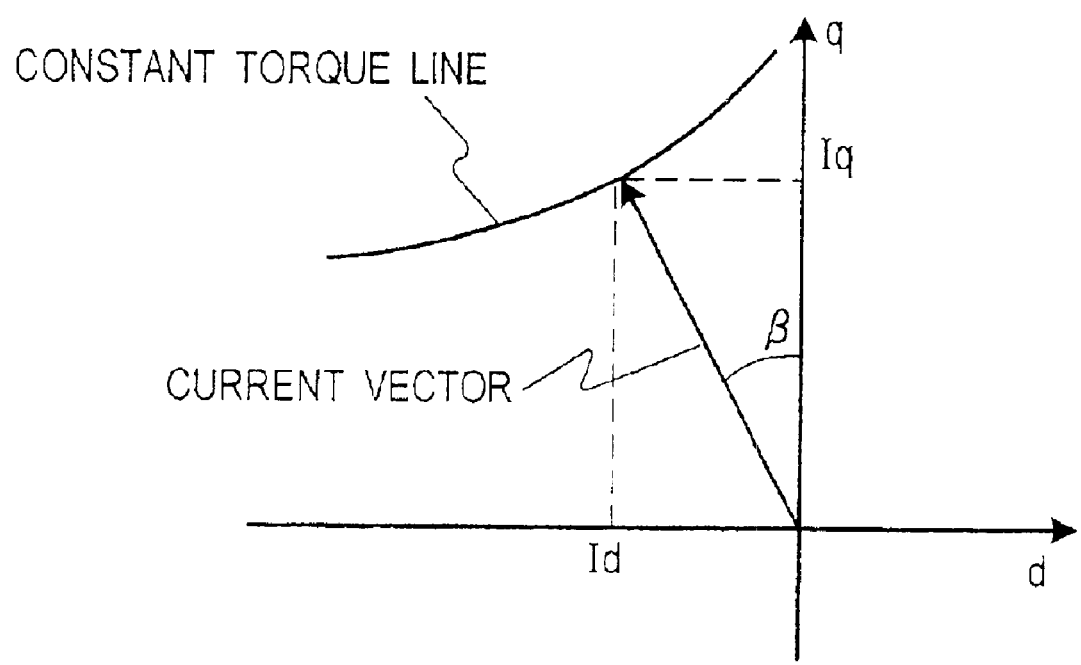
FIG. 4 is a drawing showing a relation between beta angle and a current vector.

When the current supplied to the stator coil is expressed as a vector by dividing the current supplied to the stator coil into a field current (d axis current) and a torque current (q axis current), the beta angle corresponds to the angle of the current vector with respect to the q axis (FIG. 4). When the motor is controlled, the beta angle $\beta$ and length l of the current vector (equivalent to amplitude of alternating current supplied to stator coil) are determined according to the rotation speed of the rotor and the target torque, and a target d axis current tld and target q axis current tlq are found from the beta angle $\beta$ and the length l of the current vector. An inverter command value is also computed from the target d axis current tld, target q axis current tlq and rotor phase $\theta$, the inverter 5 is driven based on this command value, and the current which flows to the stator coil is controlled.

As for the phase detector 2, the angular resolution is only 60 degrees as described above. However, when the rotor is rotating above a certain speed, a comparatively precise rotor phase can be obtained by a known estimation computation. In this embodiment also, the estimation of the rotor phase is performed when the rotor rotation speed is higher than a predetermined speed V0 (estimation mode).

On the other hand, when the rotor is not rotating, or when it is rotating at a very low speed, the rotor phase $\theta$ cannot be precisely estimated. Then, when the rotor rotation speed is less than the predetermined rate V0, the controller 3 sets a certain fixed value in the range where the actual rotor phase is determined to be, as the rotor phase $\theta$ for current control, and controls the current supplied to the motor 1 (fixed mode). For example, when the actual rotor phase is in the 120 to 180 degree range, the rotor phase $\theta$ for current control is fixed at an intermediate value of 150 degrees to control the current. In this case, as the actual rotor phase and the rotor phase $\theta$ used for current control generate a maximum offset of 30 degrees, the actual torque which the motor 1 generates may be smaller than the target torque.

Moreover, it may occur that the rotor does not rotate even if the motor 1 generates a certain amount of torque. This may happen for example when the motor 1 is a motor which drives the drive wheels of a vehicle, and the drive wheels are about to go over a bump in the road. Even when a bump is one which the vehicle can pass if the motor 1 generates the maximum torque, under current control in the fixed mode, the maximum torque falls off and so it may be impossible to overcome this level difference.

Hence, when such a situation arises, the controller 3 performs rotor phase variation control which gradually varies the rotor phase $\theta$ for current control in the range where the actual rotor phase is determined to be (correction mode). In a process wherein the rotor phase $\theta$ for current control is varied gradually, as there will always be a time at which the rotor phase for current control coincides with the rotor phase when the maximum torque is generated, the maximum torque will always be obtained, even if only temporarily.

Next, the details of the above-mentioned control performed by the controller 3 will be described. The flowcharts of FIG. 5 and subsequent figures show a control routine performed by the controller 3 at a periodic or predetermined timing.

Figure 5:
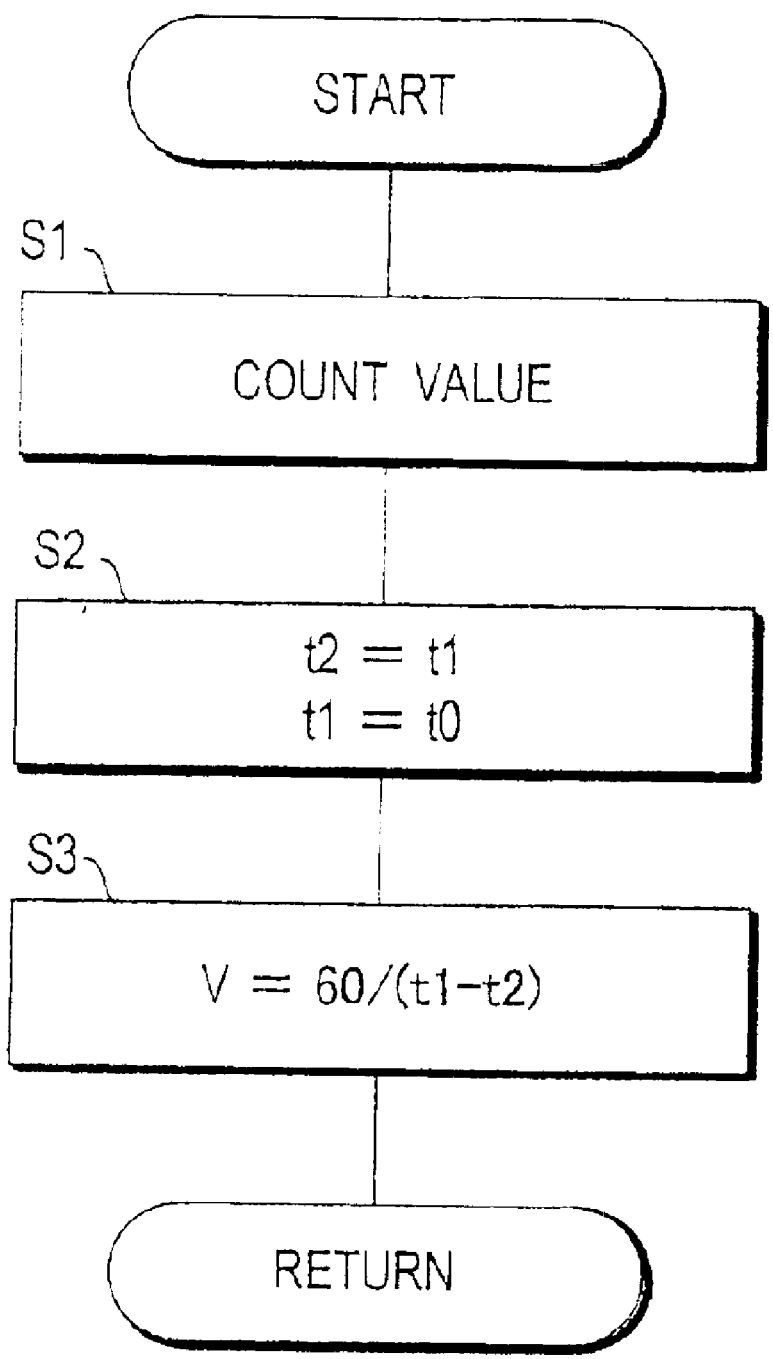
FIG. 5 is a flowchart of a rotor rotation speed computation routine.

FIG. 5 is a routine for computing the rotation speed of the rotor of the motor 1. This routine is performed whenever the output of any of the three hall devices 2a–2c varies (from OFF to ON or ON to OFF), i.e., whenever the rotor rotates through an electrical angle of 60 degrees.

In a step S1, a present value is acquired from a timer counter counted at a predetermined incremental time, and t0 is set to the acquired value.

In a step S2, the value of t1 is substituted in t2, and t0 acquired in the step S1 is substituted in t1. t1 represents the present time and t2 represents the time when this routine was performed on the immediately preceding occasion.

In a step S3, 60 degrees is divided by the time (t1−t2) required by the rotor to rotate through 60 degrees to compute the rotor rotation speed V.

Figure 6:
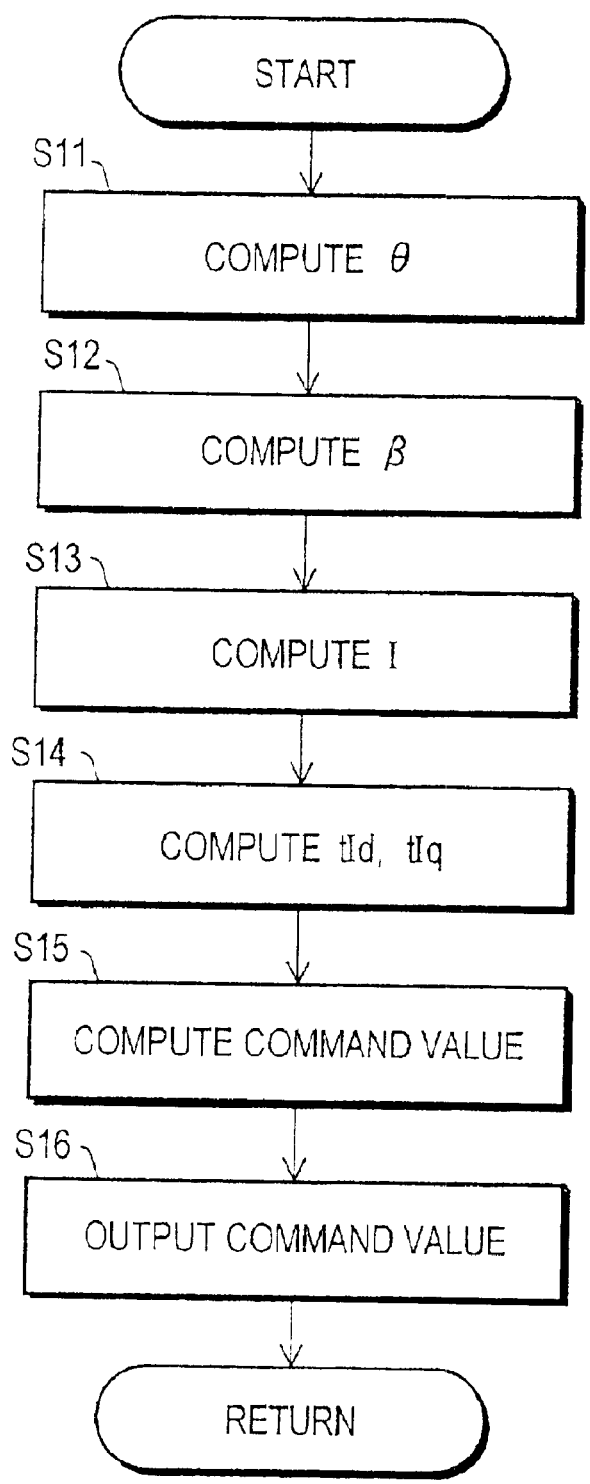
FIG. 6 is a flowchart of a main control routine.

FIG. 6 is a main control routine for controlling the supply current to the motor 1.

In a step S11, the rotor phase $\theta$ used for the current control is computed. The computation of the current control rotor phase $\theta$ is performed according to a rotor phase computation subroutine (FIGS. 7–10).

In a step S12, the beta angle $\beta$ is computed based on the rotor rotation speed V and the target torque tT supplied from outside, for example by looking up a map which specifies the relation between the beta angle $\beta$, the motor rotation speed V and the target torque tT. Herein, instead of supplying the target torque tT from outside, it may be computed by the controller 3.

In a step S13, the current amplitude I is computed based on the rotor rotation speed V and the target torque tT supplied from outside, for example by looking up a map which specifies the relation between the current amplitude 1, the rotor rotation speed V and the target torque tT.

In a step S14, the target d axis current tld and the target q axis current tlq are computed based on the beta angle $\beta$ and the current amplitude l.

In a step S15, a command value of the current supplied to the motor 1 is computed based on the target d axis current tld, the target q axis current tlq and the current control rotor phase $\theta$.

In a step S16, the command value is sent to the inverter driver 4. The inverter driver 4 generates a PWM signal based on this command value. According to this PWM signal, a switching component of an inverter 5 switches ON and OFF, and the current flowing to the stator coil of the motor 1 is controlled.

Figure 7:
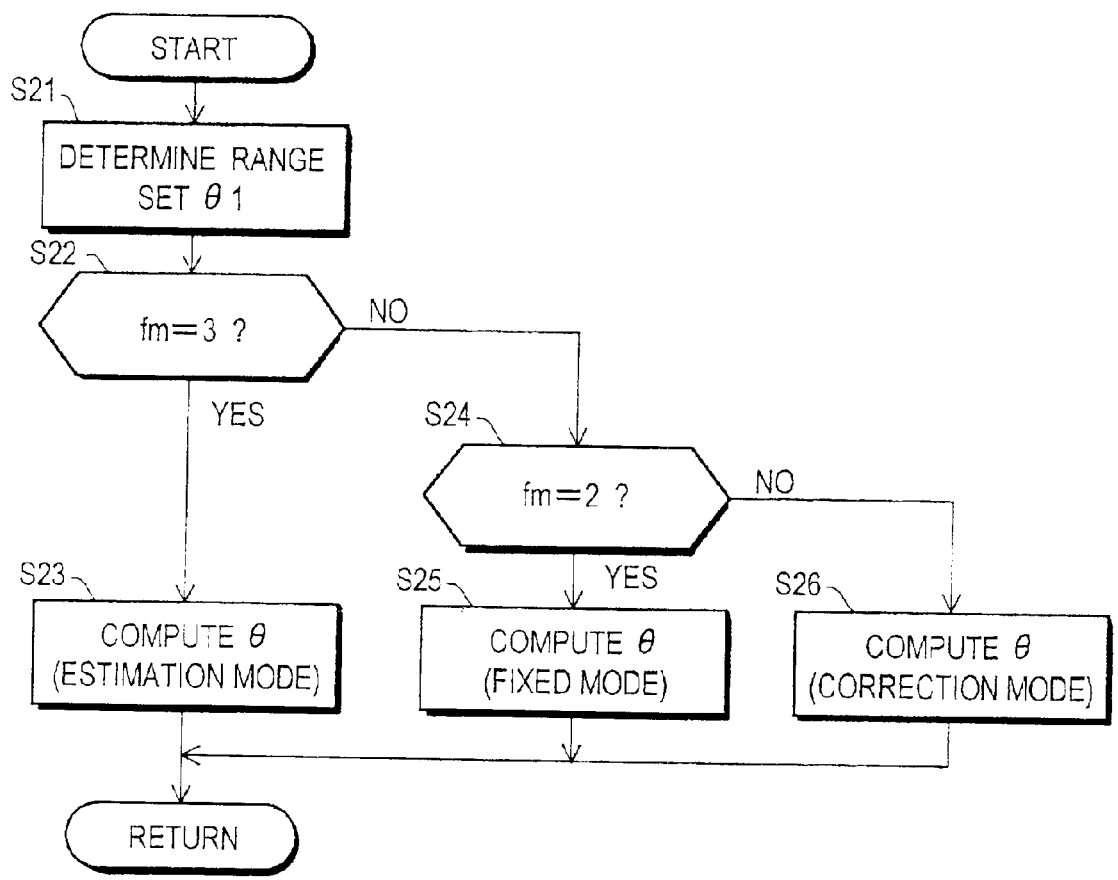
FIG. 7 is a flowchart of a rotor phase computation subroutine.

FIG. 7 is a subroutine for computing the current control rotor phase, and shows the details of the processing performed in the step S11 of the main control routine.

In a step S21, it is determined in which range the actual rotor phase is from a combination of the on-off signals of the hall devices 2a–2c of the rotor phase detector 2, and a range head phase $\theta 1$ is set to the head of the range in which the actual rotor phase exists. For example, when the first hall device 2a is ON, the second hall device 2b is ON and the third hall device 2c is OFF, it is determined that the actual rotor phase lies within the 120 to 180 degree range, and in this case, the range head phase θ1 is set to 120 degrees.

Figure 12:
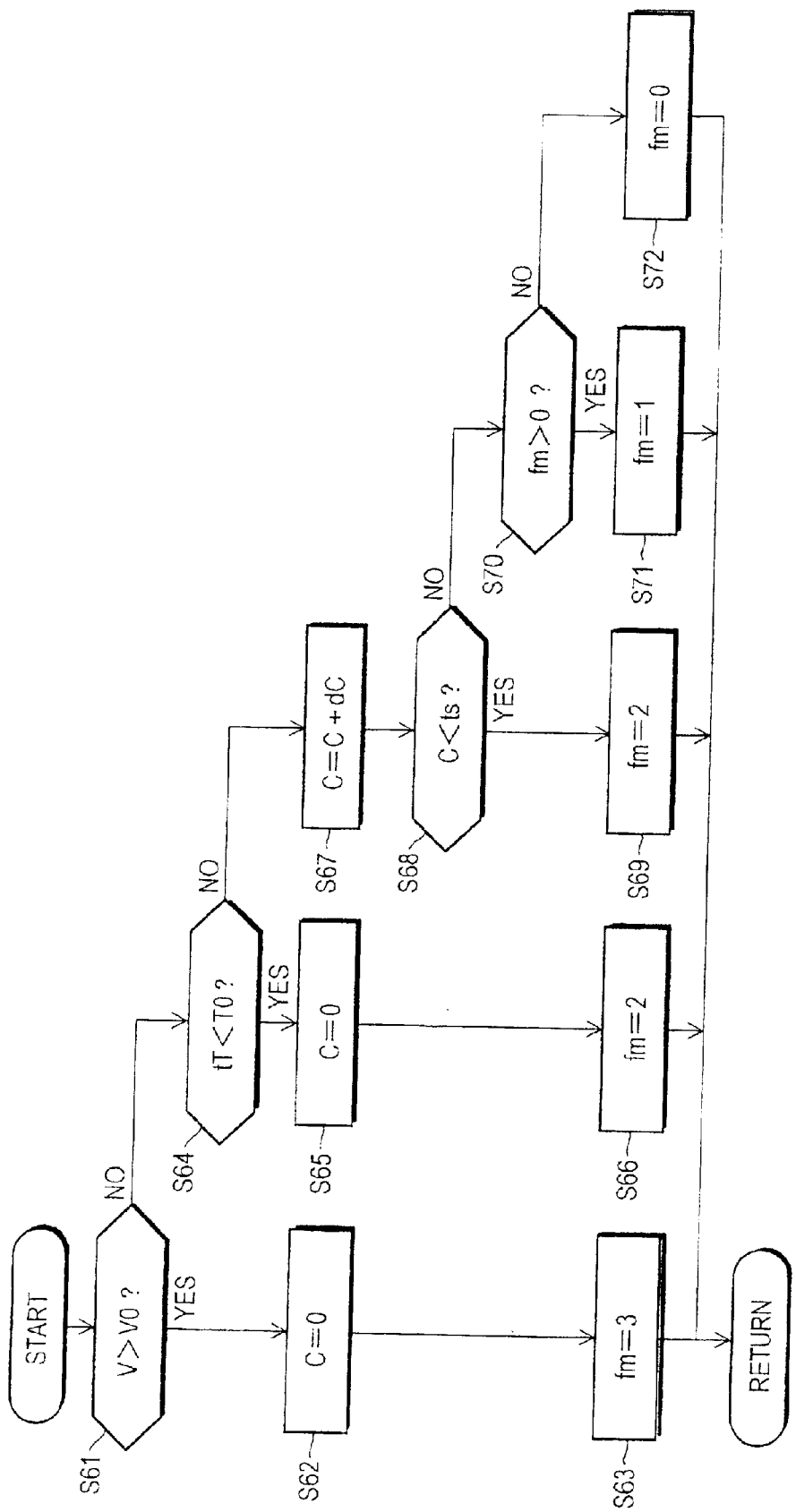
FIG. 12 is a flowchart of a mode selection routine.

In steps S22–S26, the rotor phase θ is computed according to the mode shown by a mode selection flag fm. The mode selection flag fm is a flag set by a mode selection routine, described later (FIG. 12). When the mode selection flag fm is "3", the estimation mode is selected, when it is "2", the fixed mode is selected, and when it is "1" or "0", the correction mode is selected.

Figure 8:
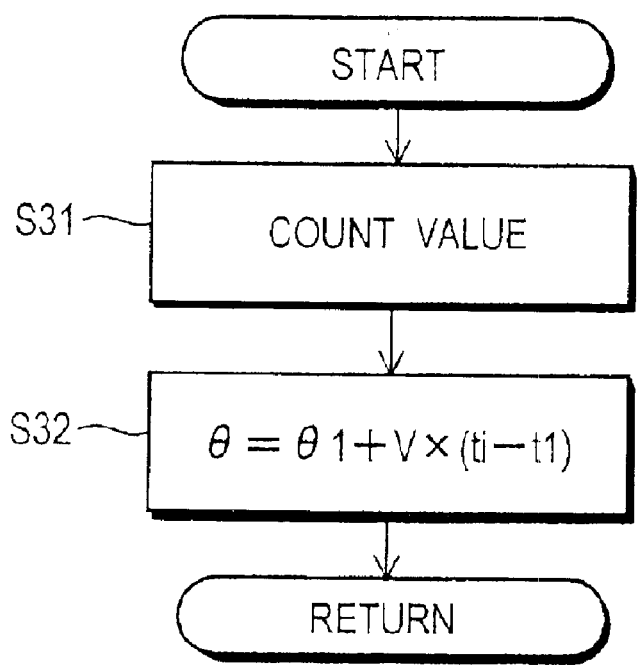
FIG. 8 is a flowchart of a rotor phase computation subroutine in an estimation mode.

FIG. 8 is a routine for computing the current control rotor phase in the estimation mode. This shows the details of the processing of the step S23 in the rotor phase computing subroutine.

In a step S31, a present value is acquired from the timer counter (identical to step S1 of FIG. 5), and ti is set to the acquired value.

In a step S32, the rotor phase is estimated, and the current control rotor phase θ is set to this estimated rotor phase. Specifically, a difference between a time t1 at which the actual rotor phase has just become the range head phase θ1 (identical to t1 of the step S2 of FIG. 5) and the present time ti is multiplied by the rotor rotation speed V, and the current control rotor phase θ is set to the value obtained by adding the range head phase θ1.

Figure 9:
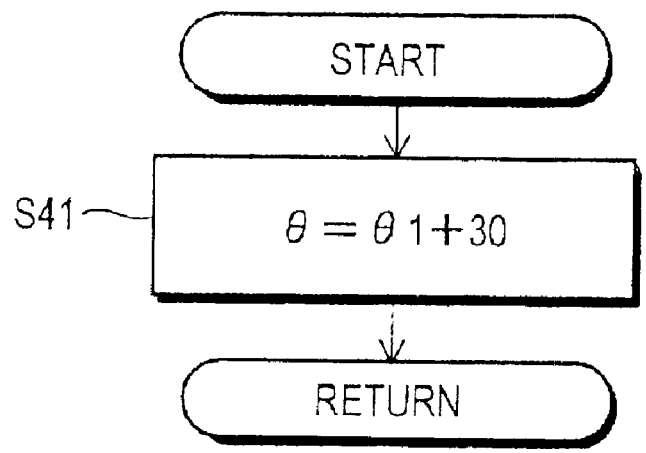
FIG. 9 is a flowchart of a rotor phase computation subroutine in a fixed mode.

FIG. 9 is a subroutine for computing the current control rotor phase in the fixed mode. This shows the details of the processing of the step S25 of the rotor phase computing subroutine.

In a step S41, a fixed value (herein, 30 degrees) is added to the range head phase θ1 to compute the current control rotor phase θ.

Figure 10:
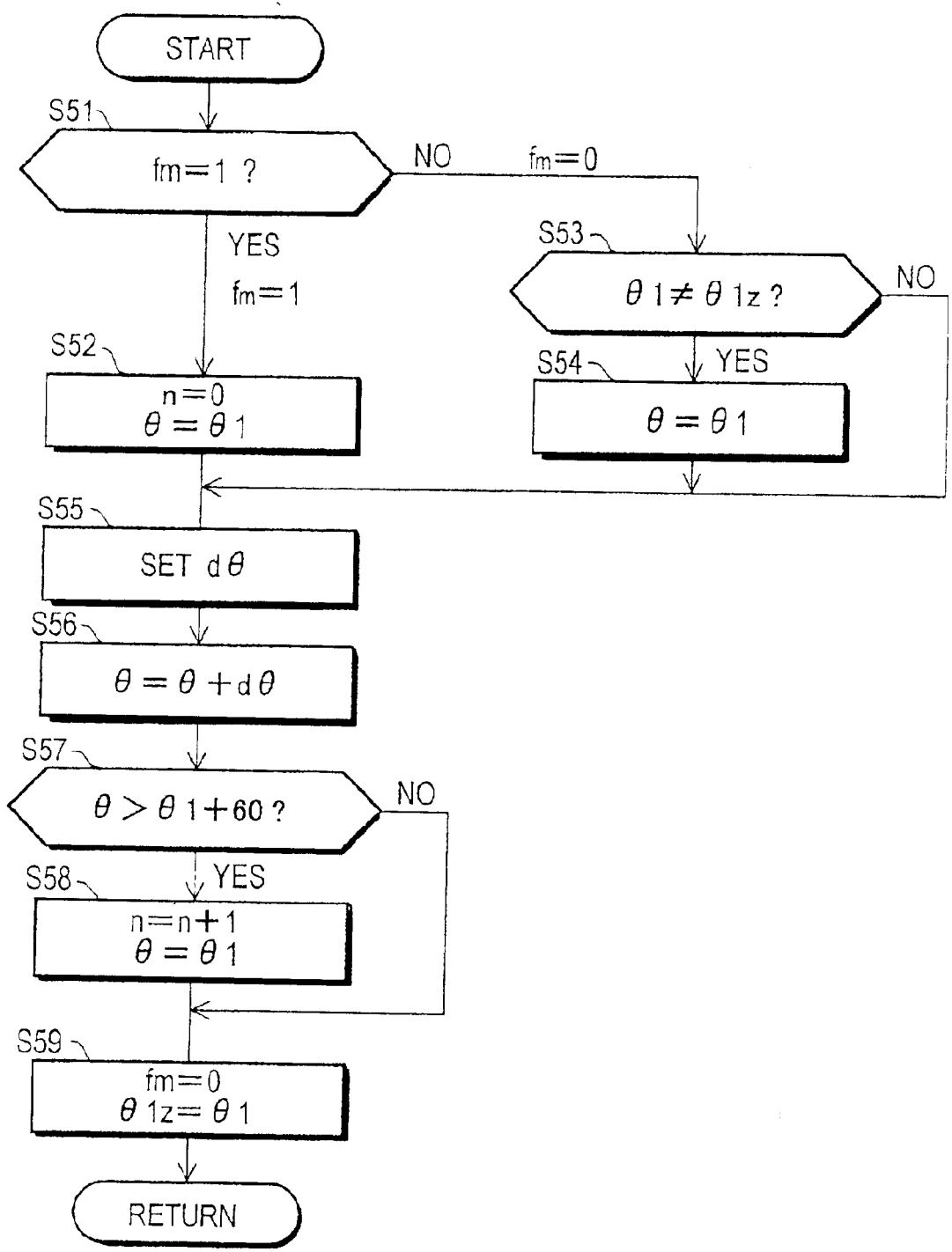
FIG. 10 is a flowchart of a rotor phase computation subroutine in a correction mode.

FIG. 10 is a subroutine for computing the current control rotor phase θ in the correction mode. This shows the details of the processing of the step S26 of the rotor phase computing subroutine.

In a step S51, it is determined whether or not the mode selection flag fm is "1". When the correction mode is selected, the flag fm is "1" or "0", and in particular, when the flag fm is "1", it shows that there has just been a shift from another mode to the correction mode. When the flag fm is "1", the routine proceeds to a step S52, and initialization immediately following the correction mode shift is performed. Specifically, the value of a counter n is set to zero, and the initial value of the current control rotor phase θ is set to the range head phase θ1.

Before the shift to the correction mode, the fixed mode was probably selected, and the rotor phase at this time is θ+30 degrees. When the current control rotor phase θ varies suddenly to θ1, there may be a sharp change of torque, and if a sharp torque variation is a problem, the current control phase θ may be gradually returned from θ1+30 degrees to θ1. The counter n is the number of times where the rotor phase variation control is performed (taking the number of changes in θ from the minimum value to the maximum value of the range, as 1).

On the other hand, when it is determined that the mode selection flag fm is not "1" (fm=0), the routine proceeds to a step S53, and it is determined whether or not the range head phase θ1 set in the step S21 of FIG. 7 is different from a range head phase θ1z on the immediately preceding occasion this routine was performed, i.e., it is determined whether or not the range shifted during the correction mode. When the range shifted, the routine proceeds to a step S54, the rotor phase θ is set to the range head phase θ1 as processing performed during the range shift, and the processing of a step S55 and subsequent steps is performed.

If there was a range shift during the correction mode control, i.e., when a phase signal was detected from the phase detector 2, this detected phase is taken as an initial value, and the correction mode is continued. In this way, a high torque is obtained continuously under high load, and therefore startup under high load can be performed smoothly and surely. It should be noted that the fact that there was a range shift shows that there has been some rotor rotation, even if slight, so the correction mode can be temporarily terminated.

Figure 11:
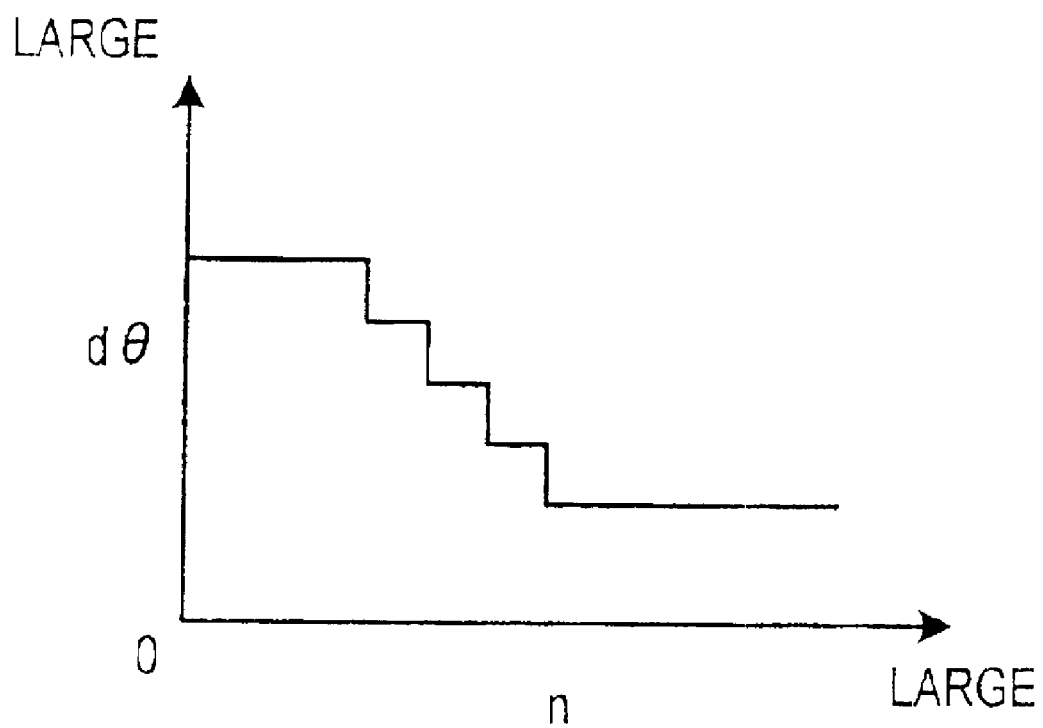
FIG. 11 is a phase variation amount computation table.

When it is determined in the step S53 that the range has not shifted, the routine proceeds to the processing of the step S55 and subsequent steps. In the step S55, a phase variation amount dθ under rotor phase variation control is computed based on the counter n. Specifically, as shown in FIG. 11, the phase variation amount dθ is computed by looking up a preset table set so as to give dθ according to the counter n. This table is set so that the phase variation amount dθ becomes smaller as the counter n becomes larger, as shown in the figure. When the phase variation amount dθ is large, one set (change of θ from the minimum value to the maximum value of the range) can be completed in a short time, but the time for which the maximum torque is obtained is also short. Hence, rotor phase variation control is firstly performed using a large phase variation amount dθ, and when a shift to the estimation mode cannot be performed under this control (corresponding to the state where, in the aforesaid example, the vehicle cannot pass over a bump in the road), rotor phase variation control is repetitively performed while gradually decreasing the phase variation amount dθ.

When correction mode control is repeated, by decreasing the phase setting unit, i.e., by decreasing the phase variation amount dθ the larger the number of repetitions becomes, the angular velocity of the current vector phase can be decreased to a degree which does not cause the loss of synchronization while the startup operation is repeated, so the load range under which startup can be performed is enlarged.

It should be noted that the initial value (maximum value) of the phase variation amount dθ is set such that the rotor phase variation speed is not faster than the rotor rotation speed when the maximum torque is generated under the maximum running load expected to occur according to the design (in the case of the aforesaid vehicle, when the vehicle is driving over the maximum bump which the vehicle can pass over).

In a step S56, the phase variation amount dθ is added to the present rotor phase θ to compute a new current control rotor phase θ.

In a step S57, it is determined whether or not the current control rotor phase θ computed in the step S56 exceeds a range maximum phase (θ1+60 degrees). When the current control rotor phase θ exceeds θ1+60 degrees, the routine proceeds to a step S58, the counter n is counted up, and the current control rotor phase θ is returned to the range head phase θ1. When the current control rotor phase θ is returned from θ1+60 degrees to θ1 in stepwise fashion, it is possible that there will be a sudden change of torque, and if a sudden change of torque is a problem, the current control rotor phase θ is returned to θ1 gradually. When the current control rotor phase θ is less than θ1+60 degrees, the routine proceeds directly to a step S59 and subsequent steps.

In the step S59, the flag fm is set to "0" (i.e., the control mode is the correction mode and rotor phase change control is being performed), and the present range head phase θ1 is stored as the immediately preceding value θ1z of the rotor phase.

The phase setting unit, i.e., the phase variation amount dθ, is set to less than what corresponds to the speed computed from the maximum load and maximum torque that can be conceived from the design, therefore high torque output can be maintained while advancing the rotation angle, the rotor of the motor 1 does not easily fall out of step with the control current vector, and startup performance improves. The phase setting unit may also be determined from the vehicle weight and maximum torque. In this way, for example, fall out of the motor 1 when an extremely high load is acting in the stationary state or at very low running speeds, such as when the vehicle goes over a bump, is suppressed.

Further, even if the setting unit reaches the maximum value of the set range, if a phase signal was not detected from the phase detector 2, control is repeated in the correction mode from the minimum value, so incorrect operation of the motor 1 after it has fallen out relative to the rotor magnetic field is prevented, and startup control can be repeated. The startup can be repeated even if the vehicle fails to start.

FIG. 12 is a mode selection routine, and this is performed at a predetermined interval separately from the aforesaid main control routine.

In a step S61, it is determined whether the rotor rotation speed V is higher than the predetermined speed V0. The predetermined speed V0 is a threshold value near zero for determining whether the rotor is almost in the stop state. When the rotor rotation speed V is higher than the predetermined speed V0, the routine proceeds to a step S62, and the counter C is reset to zero. In a step S63, the flag fm is set to "3" indicating the estimation mode.

When it is determined that the rotor rotation speed V is less than the predetermined speed V0 in the step S61, the routine proceeds to a step S64, and it is determined whether or not a target torque tT is less than a predetermined torque T0. The predetermined torque T0 is a value corresponding to, for example, 80% of the maximum motor torque. Even if the rotor rotation speed V is less than V0, when the driver of the motor does not require a large torque, it is unnecessary to select the correction mode, so this determination is performed.

In a step S64, when the target torque tT is less than the predetermined torque T0, the routine proceeds to a step S65, the counter C is reset to zero, and in a step S66, the flag fm is set to "2" indicating the fixed mode. When it is determined that the target torque tT is greater than T0, the routine proceeds to a step S67, the counter C is increased by a predetermined value dC, and in a step S68, it is determined whether or not the counter C is less than a predetermined value ts.

In a step S69, when the counter C is less than the predetermined value ts, the routine proceeds to a step S69, and the flag fm is set to "2" indicating the fixed mode. In other words, even if the driver requires a large torque, and even if a state occurs where the rotor is hardly rotating, the fixed mode is selected until this state has continued for a predetermined time. When it is determined that the counter C is larger than the predetermined value ts, the correction mode is selected by processing of a step S70 and subsequent steps. In other words, if a phase signal was not detected from the phase detector 2 even if the state wherein the torque command value to the motor 1 or its representative parameter (here, target torque) is greater than a reference value continues for a set time, the correction mode is selected. Hence, if it is determined that the motor 1 actually has a torque insufficiency, the correction mode which realizes the maximum torque is selected, and startup can be performed with high efficiency under high load.

In a step S70, in order to distinguish whether there was a shift from another mode to the correction mode, or the correction mode is already selected and a reselection has been made while rotor phase variation control is being performed, it is determined whether or not the present flag fm is larger than "0". When the flag fm is larger than "0", it is determined that there was a shift from another mode, the routine proceeds to a step S71, and the flag fm is set to "1" indicating that the control mode is the correction mode and there has just been a mode shift. When the flag fm is "0", the routine proceeds to a step S72, and the value of the flag fm is maintained at "0".

In the control system according to this invention, by providing the correction mode wherein a set pseudo detection phase (current control rotor phase) is modified by predetermined phase units instead of using the actual rotation phase of the motor 1, the motor 1 can be driven at a current vector phase which extracts the maximum torque in the variable setting process. As described in the above embodiment, although the phase detector 2 having a resolution as low as a phase angle of 60 degrees is used, the torque insufficiency or rapid torque change generated during startup or in the very low speed region when it is difficult to estimate the phase by computation, can be eliminated.

Next, a second embodiment of this invention will be described.

Whereas, in the first embodiment, the maximum torque was generated by varying the current control rotor phase in the correction mode, in the second embodiment, the beta angle β for motor control is varied. Specifically, in this embodiment, when the rotor phase is computed in the step S11 of the main control routine of FIG. 6, when the flag fm is "3", the current control rotor phase is computed in the estimation mode (FIG. 8), and when the flag fm is "2", "1" or "0", the current control rotor phase is computed in the fixed mode (FIG. 9). Therefore, the computation of current control rotor phase in the correction mode is not performed.

Further, when the beta angle is computed in the step S12 of the main control routine, when the flag fm is "3" or "2", a value βm obtained by looking up a map is set as it is to the beta angle β. When the flag fm is "1" or "0", the beta angle is computed using a correction mode beta angle computing subroutine, described later.

Figure 13:
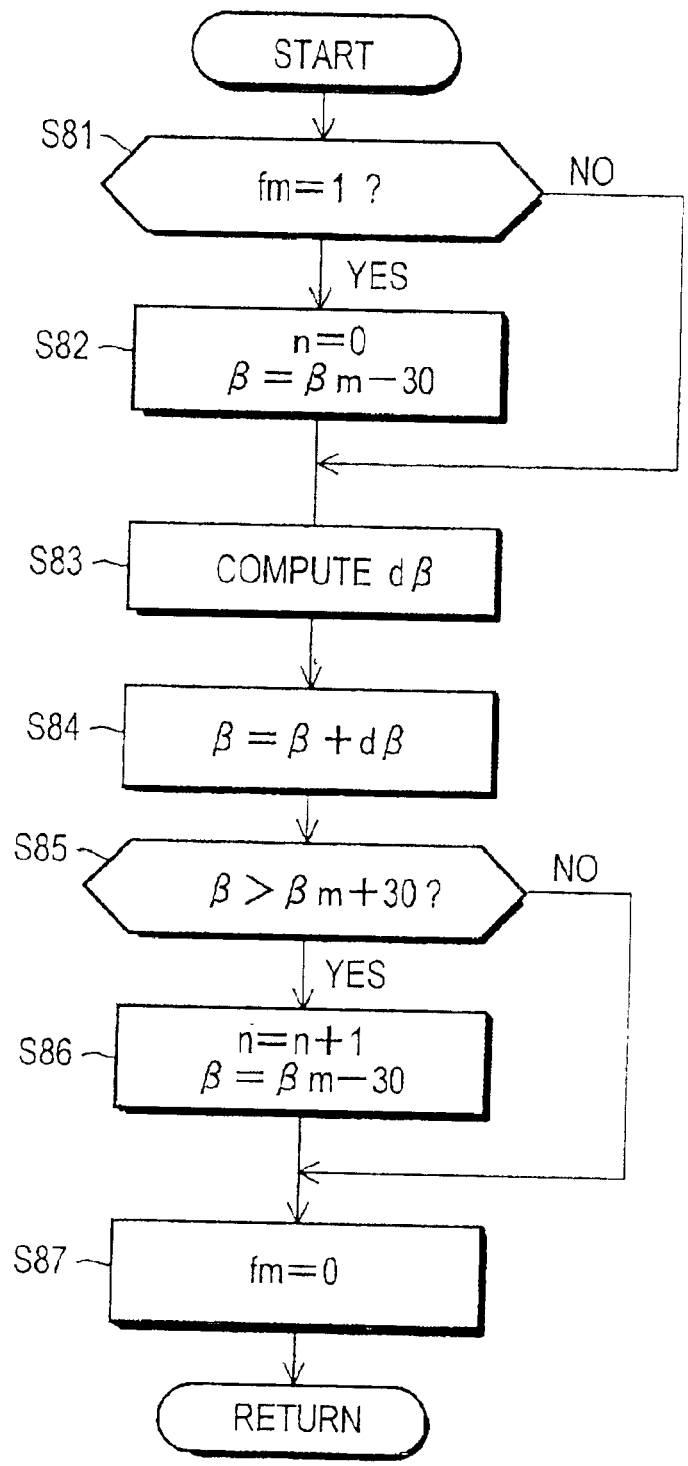
FIG. 13 shows a second embodiment, and is a flowchart of a correction mode beta angle computation subroutine.

FIG. 13 shows the correction mode beta angle computing subroutine.

In a step S81, it is determined whether or not the flag fm is "1". When the flag fm is "1", the routine proceeds to a step S82, and initialization immediately after the shift to the correction mode is performed. Specifically, the value of the counter n is reset to zero, and the initial value of the beta angle β is set to a value obtained by subtracting 30 degrees from the map value βm.

Figure 14:
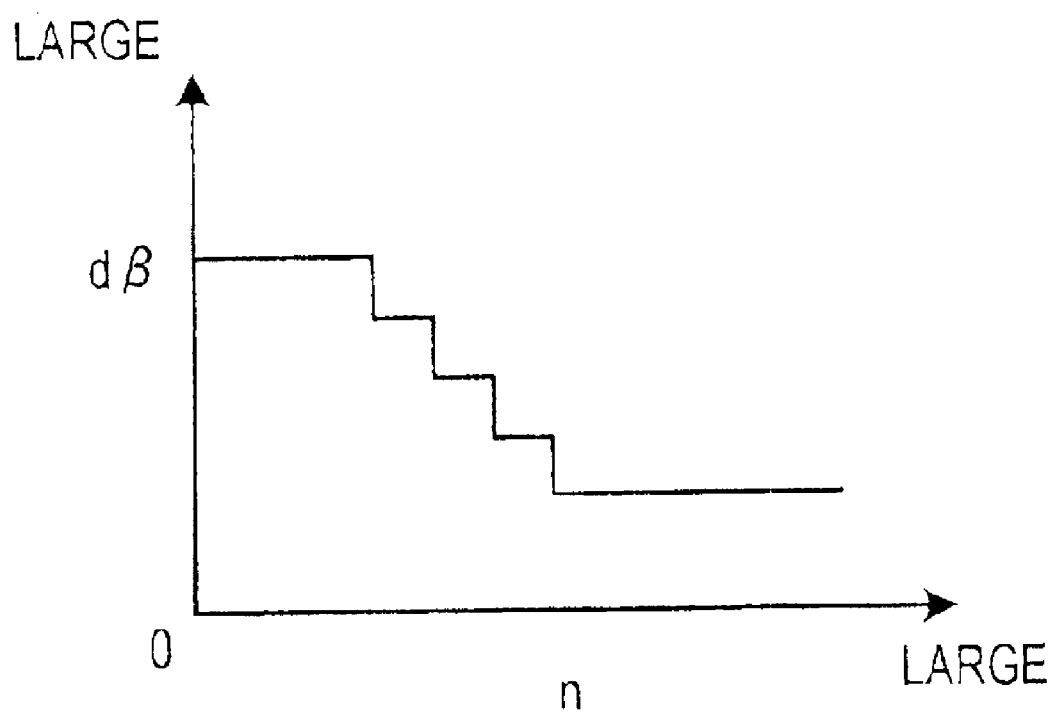
FIG. 14 is a beta angle variation amount computation table.

In a step S83, an angle variation amount dβ is computed for beta angle variation control based on the counter n. The angle variation amount dβ may for example be found by looking up a table which is preset to give the angle variation amount dβ according to the counter n. This table may for example be such that the angle variation amount dβ decreases the larger the counter n becomes, as shown in FIG. 14.

In a step S84, the angle variation amount dβ is added to the present beta angle β to compute a new beta angle β.

In a step S85, it is determined whether or not the angle beta computed in the step S84 exceeds βm+30 degrees. When the beta angle β exceeds βm+30 degrees, the routine proceeds to a step S86, 1 is added to the counter n, and the beta angle β is returned to βm−30 degrees.

In a step S87 the mode selection flag fm is set to "0".

An identical function and effect to those of the first embodiment are obtained by varying the beta angle β of the control current instead of the current control rotor phase.

Next, a third embodiment will be described.

In the third embodiment, the method of current control during startup and very low speed rotation are different from those of the first embodiment. There is no correction mode. There is only an estimation mode which estimates the rotor phase θ by computation when the rotor rotation speed is higher than V0 which corresponds to a predetermined low speed, and a fixed mode which sets the rotor phase θ to a fixed value in the range wherein the rotor exists when the rotor rotation speed is less than the predetermined low speed V0.

In the fixed mode, as in the case of the aforesaid embodiment, when it is known for example that the actual rotor phase is in the range from 120 degrees to 180 degrees, current control is performed by fixing the current control rotor phase θ to the intermediate value of 150 degrees. However, in current control by the fixed mode, even if the beta angle β is set to the optimum value, the actual rotation magnetic field phase does not coincide with the optimum value, and the average torque which is actually obtained is less than the torque when optimum current control is performed according to the real phase of the rotor.

Therefore, the motor torque changes abruptly when there is a shift from the fixed mode to the estimation mode wherein optimum current control is performed according to the precise estimated value of the rotor phase. In the third embodiment, the current amplitude in the fixed mode is set larger than the current amplitude in the estimation mode to avoid a sharp increase of torque when there is a mode shift, and the torque in both modes becomes equal.

However, as there is an upper limit to the current amplitude which can be output by the inverter 5, even if it attempted to set the current amplitude as above, the current amplitude in the fixed mode cannot be set higher than this upper limit. In other words, the same torque as the torque which can be obtained by the inverter 5 outputting the maximum current amplitude in estimation mode current control, cannot be obtained in the fixed mode. Consequently, if there is a mode shift when the target torque is set exceeding the performance of the inverter 5 (when the inverter 5 outputs the maximum current amplitude), it becomes impossible to avoid a sharp change of torque due to the aforesaid current amplitude setting.

In this case therefore, limiter processing is performed on the torque command value for current control, and by appropriately setting this torque limiter, a sharp change of torque command value is avoided and a sharp change of torque due to a mode shift when running under high load is avoided.

Hereafter, the details of the control performed by the controller 3 will be described. The routine for computing the rotor rotation speed is identical to that of the aforesaid embodiments (FIG. 5), and is description is therefore omitted.

Figure 15:
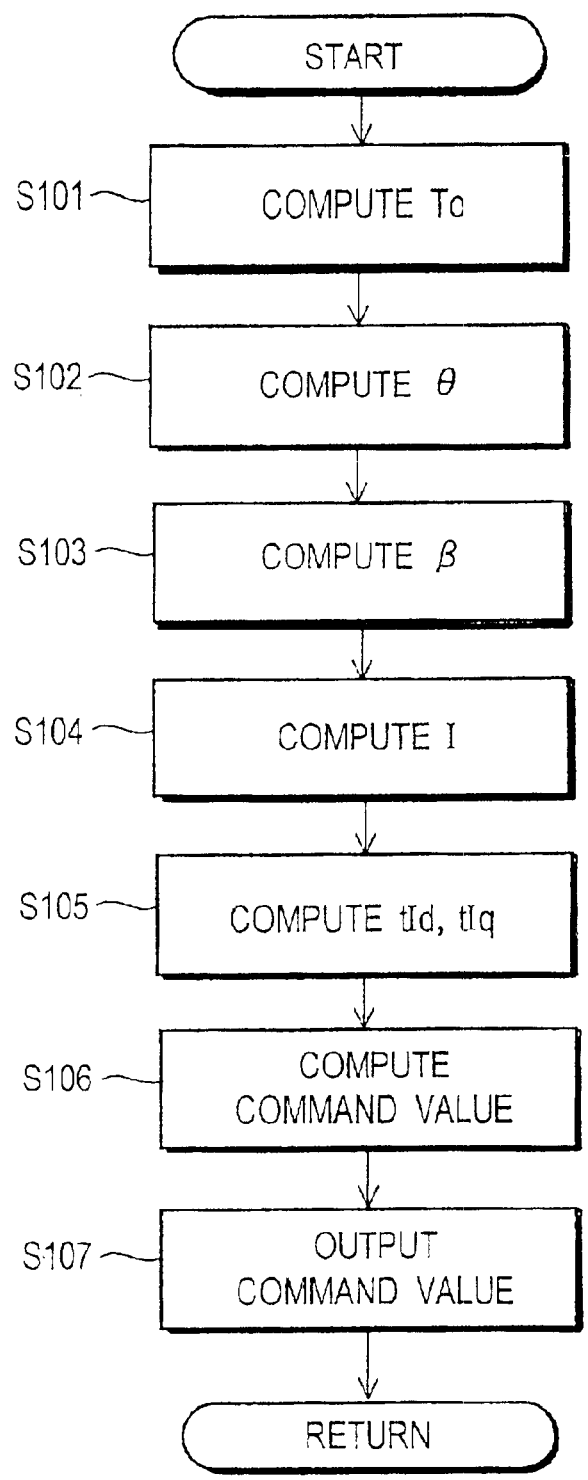
FIG. 15 shows a third embodiment, and is a flowchart of a routine for calculating a command value of a supply current to a motor.

FIG. 15 is a main control routine for computing the command value of the current supplied to the motor 1, and is performed by the controller 3 at a predetermined interval.

Figure 16:
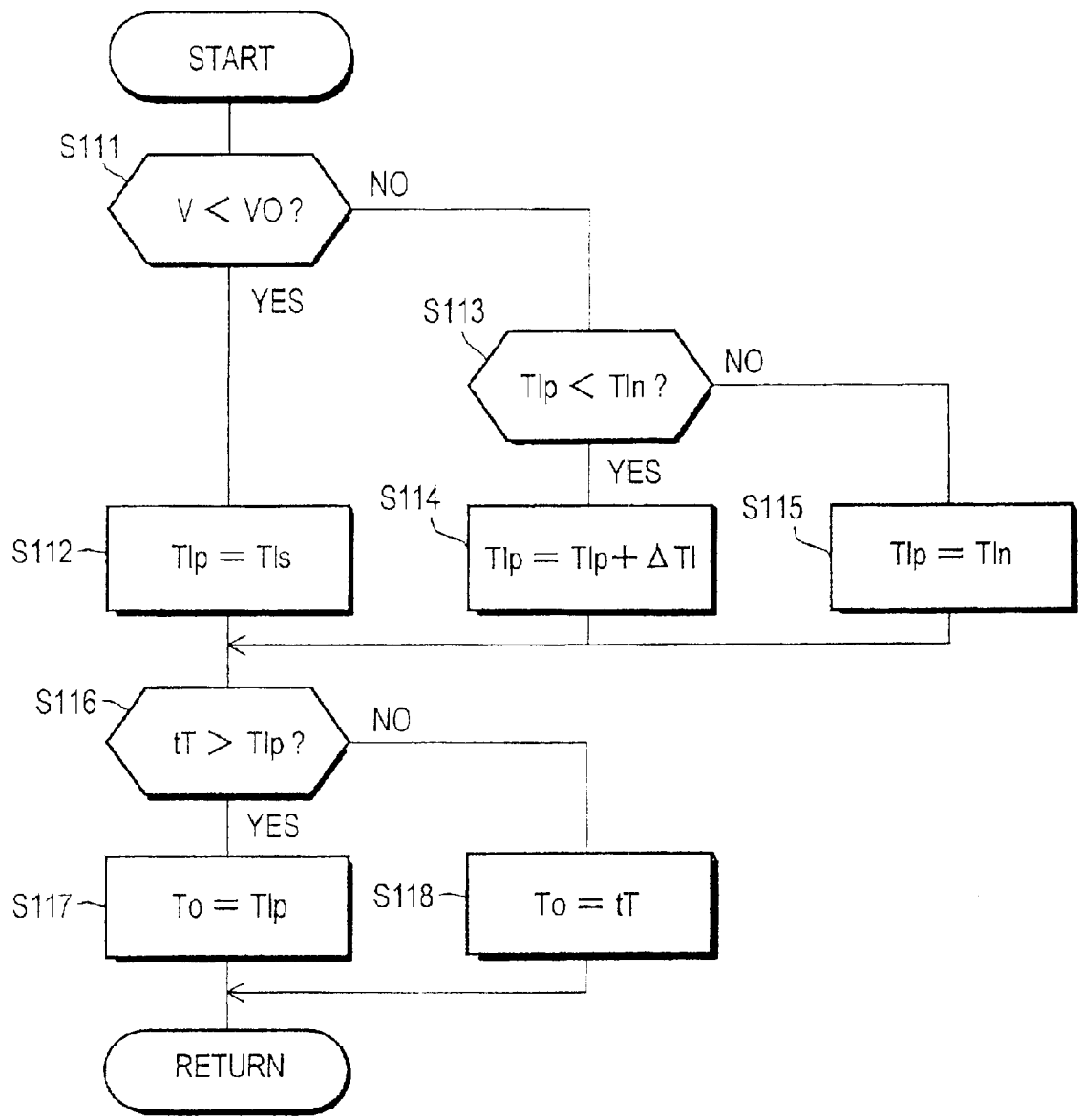
FIG. 16 is a flowchart of a torque command value computation subroutine.

In a step S101, limiter processing is performed on the target torque tT supplied from outside to compute a torque command value To. The details of the computation of the command value To are shown in FIG. 16, described later. The target torque tT may also be computed internally in the controller 3.

Figure 17:
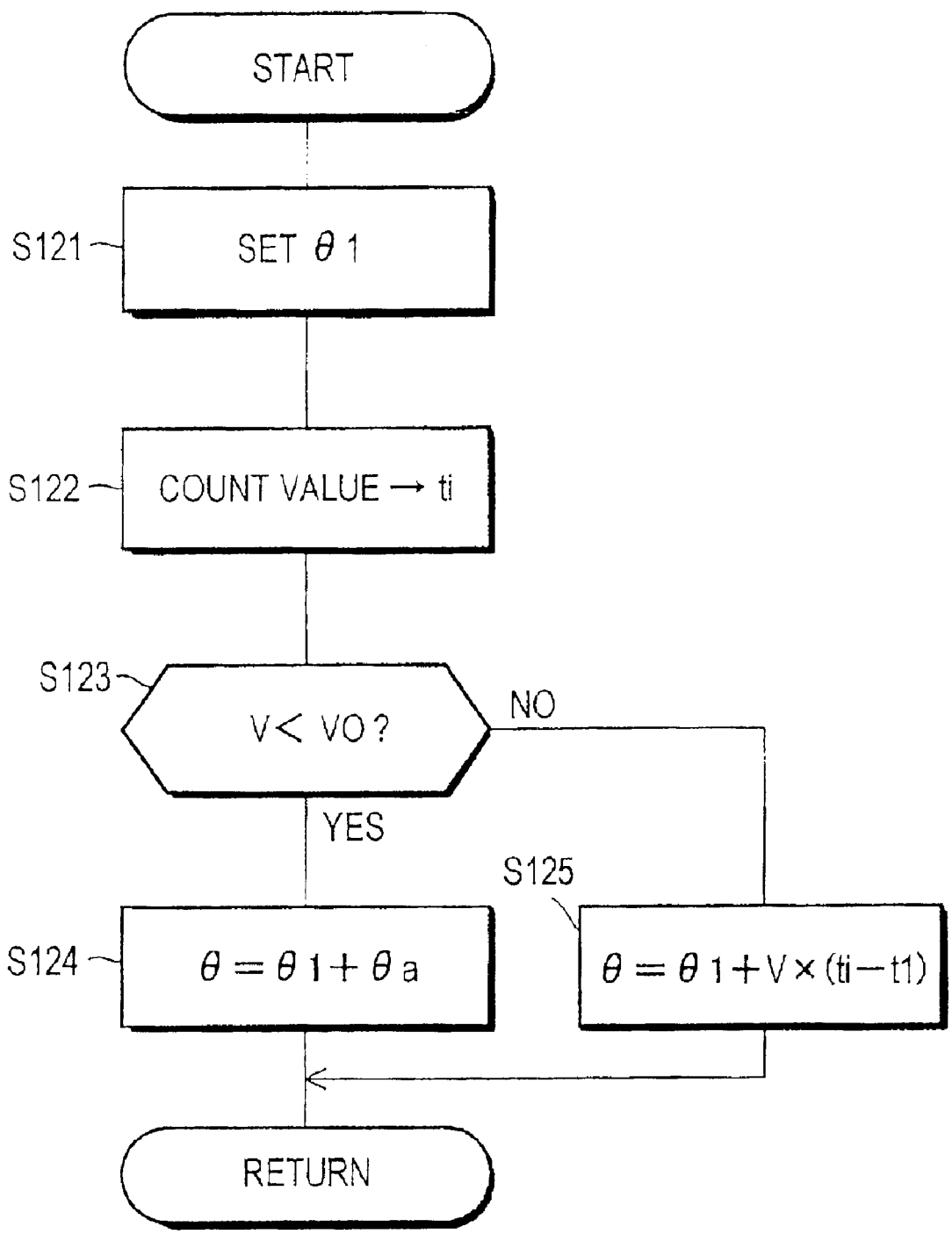
FIG. 17 is a flowchart of a rotor phase computation subroutine.

In a step S102, the current control rotor phase θ is computed. The details of the computation of the current control rotor phase θ are shown in FIG. 17, described later.

In a step S103, the beta angle β is computed based on the rotor rotation speed V and the torque command value To computed in the step S101. Specifically, the beta angle is computed by looking up a map which specifies the relation between the beta angle β, the rotor rotation speed V and torque command value To.

Figure 18:
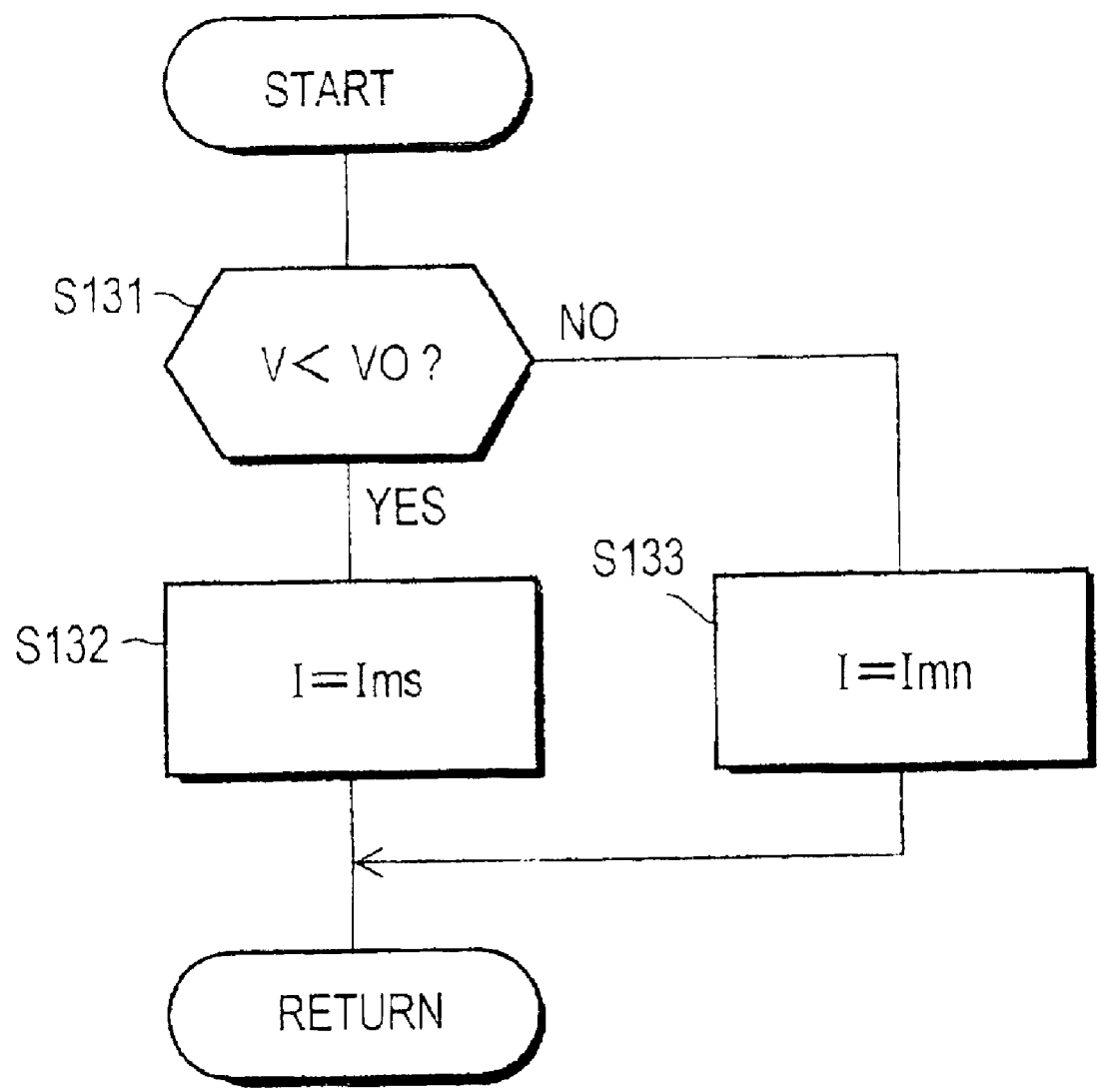
FIG. 18 is a flowchart of a current amplitude computation subroutine.

In a step S104, the current amplitude l is computed. The details of the computation of the current amplitude l are shown in FIG. 18, described later.

In a step S105, the target d axis current tId and target q axis current tIq are computed based on the beta angle β and current amplitude I.

In a step S106, the command value of the current supplied to the motor 1 is computed based on the target d axis current tId, target q axis current tIq and rotor phase θ.

In a step S107, the command value is output to the inverter driver 4. The inverter driver 4 generates a PWM signal based on this command value. The current flowing through the stator coil of the motor 1 is controlled by the ON/OFF of the switching element of the inverter 5 according to this PWM signal.

FIG. 16 is a subroutine for computing the torque command value.

In a step S111, it is determined whether or not the rotor rotation speed V is less than the predetermined value V0, i.e., a mode determination is performed. When the rotor rotation speed V is less than the predetermined value V0, the fixed mode is adopted, the routine proceeds to a step S112, and a torque limiter Tlp is set to a fixed mode torque limiter Tls. The fixed mode torque limiter Tls is the average torque when the motor 1 is run at the maximum current amplitude of the inverter 5, and it is a value corresponding to the fact that the average torque during fixed mode control is less than the torque of the motor 1 when optimum current control is performed according to the actual phase of the rotor.

When the rotor rotation speed V is higher than the predetermined value V0, the estimation mode is adopted, the routine proceeds to a step S113, and it is determined whether or not the present torque limiter Tlp is less than an estimation mode torque limiter Tln.

The estimation mode torque limiter Tln corresponds to the torque when optimum current control is performed according to the precise estimation value of the rotor phase, and the motor 1 is run at the maximum current amplitude of the inverter 5. Immediately after there is a shift from the fixed mode to the estimation mode, the torque limiter Tlp is less than the estimation mode torque limiter Tln.

When the present torque limiter Tlp is less than the estimation mode torque limiter Tln, the routine proceeds to a step S114, and a predetermined addition value ΔTl is added to the present torque limiter Tlp to compute a new torque limiter Tlp.

Conversely, when it is determined that the present torque limiter Tlp is higher than the estimation mode torque limiter Tln, the routine proceeds to a step S115, and the torque limiter Tlp is set to the estimation mode torque limiter Tln.

Due to this processing, when there is a shift from the fixed mode to the estimation mode, the torque limiter Tlp gradually approaches the estimation mode torque limiter Tln from the fixed mode torque limiter Tls.

In a step S116, it is determined whether or not the target torque tT supplied from outside is larger than the torque limiter Tlp. When the target torque tT is larger than the torque limiter Tlp, the routine proceeds to a step S117, and the torque command value To is limited to the torque limiter Tlp. However, when the target torque tT is less than the torque limiter Tlp, the routine proceeds to a step S118, and the torque command value To is set to the target torque tT without modification.

Due to the above processing, when the target torque tT is set higher than the performance of the inverter 5, the torque command value To gradually varies according to the torque limiter Tlp which varies from the fixed mode torque limiter Tls to the estimation mode torque limiter Tln gradually, and a sharp change of motor torque due to a mode change when running under high load is avoided.

FIG. 17 is a subroutine for computing the current control rotor phase.

In a step S121, it is determined in which range the actual rotor phase is from a combination of the ON/OFF signals of the hall devices 2a–2c of the rotor phase detector 2, and θ1 is set to the rotor phase at the head of the range where the actual rotor phase is determined to be. For example, when the first hall device 2a is ON, the second hall device 2b is ON and the third hall device 2c is OFF, it is determined that the actual rotor phase lies between 120 degrees to 180 degrees, and in this case, θ1 is set to 120 degrees.

In a step S122, the present count value is acquired from a timer counter (identical to step S1 of FIG. 5), and ti is set to this acquired value.

In a step S123, it is determined whether or not the rotor rotation speed V computed by the processing of FIG. 5 is less than the predetermined value V0. The predetermined speed V0 is a threshold value for determining when the rotor has effectively stopped, and is a value close to zero. When the rotor rotation speed V is less than the predetermined value V0, i.e., in the fixed mode, the routine proceeds to a step S124, and the current control rotor phase θ is set to a value obtained by adding a predetermined value θa to the rotor phase θ1. The predetermined value θa is a predetermined fixed value. When the rotor is stationary, it is impossible to estimate where the rotor phase is in the range determined in the step S121. In this case, the rotor phase θ is set to the intermediate value of the determined range, i.e., θa is set equal to 30 degrees.

When the rotor rotation speed V is higher than the predetermined value V0, i.e., in the estimation mode, the routine proceeds to a step S125, and the present rotor phase is estimated by computation. Specifically, the difference between a time t1 when the rotor phase is exactly θ1 (identical to t1 of the step S2 in FIG. 5) and the present time ti, is multiplied by the rotor rotation speed V, the value obtained by adding θ1 to this is estimated as the present rotor phase, and the current control rotor phase θ is set to this value.

FIG. 18 shows a subroutine for computing the current amplitude l.

In a step S131, a mode determination is performed by comparing the rotor rotation speed V with the predetermined value V0. In the fixed mode below the predetermined value V0, the routine proceeds to a step S132, and the current amplitude l is set to a value lms found by looking up a fixed mode current map. On the other hand, in the estimation mode, the routine proceeds to a step S133, and the current amplitude l is set to a value lmn found by looking up an estimation mode current map.

The fixed mode current map is a map which specifies the relation between the current amplitude l, the rotor rotation speed V and the torque command value To. Considering the fact that the average torque in fixed mode control is less than the torque when optimal current control is performed according to the real phase of the rotor, the current amplitude l is stored such that this reduced average torque coincides with the torque command value To.

The estimation mode current map is a map which specifies the relation between the current amplitude l, the rotor rotation speed V and the torque command value To. The current amplitude l which realizes the command value To by performing optimal current control according to the precise estimated value of the rotor phase, is stored.

Due to this processing, the current amplitude is set in accordance with each mode, and a sharp change of torque before and after a mode shift is prevented.

The operation when the control mode of the motor 1 is shifted from the fixed mode to the estimation mode will now be described referring to the time chart of FIG. 19, FIG. 20.

Figure 19:
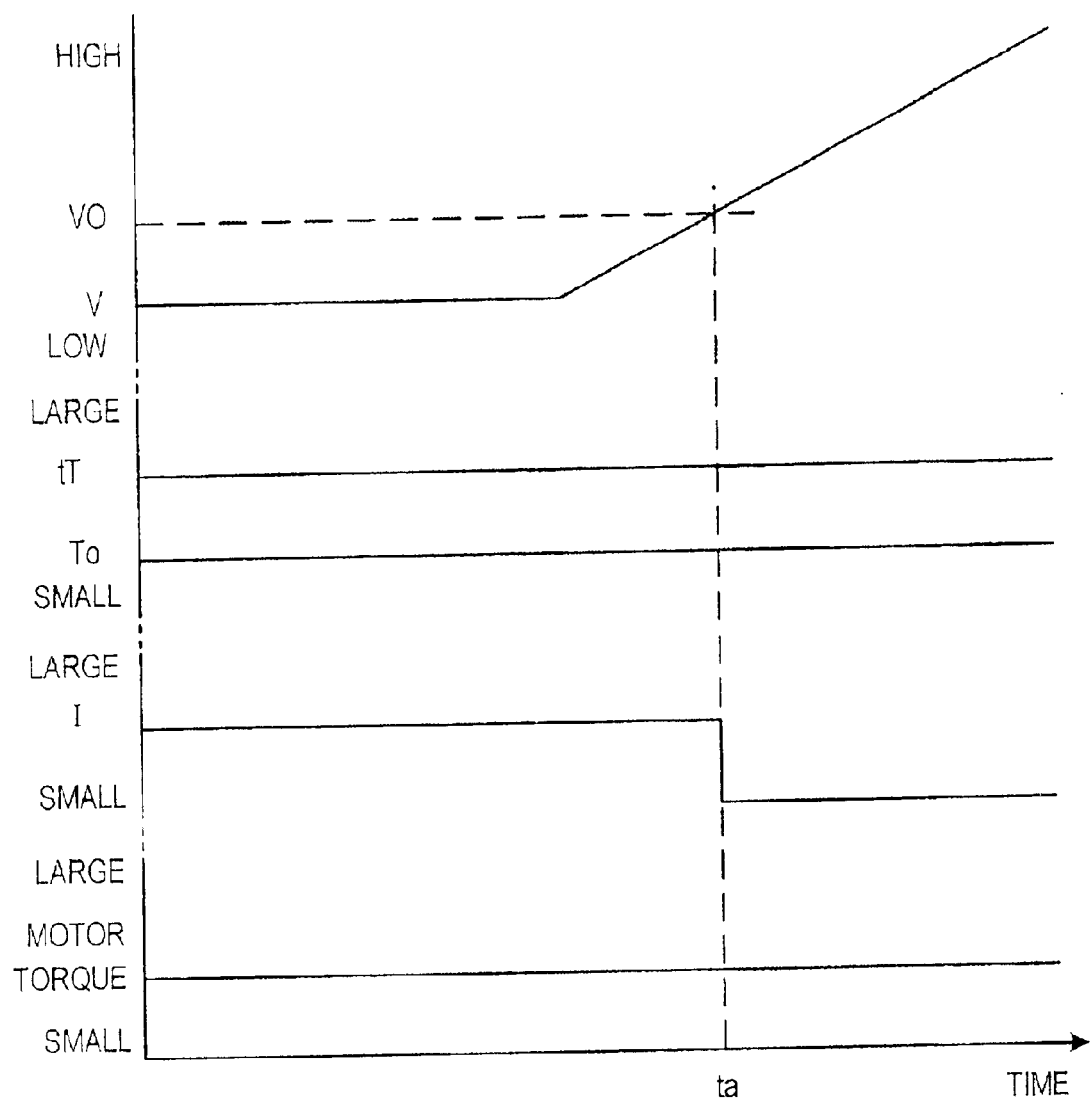
FIG. 19 is a time chart showing an operation when the control mode shifts to the estimation mode from the fixed mode.

FIG. 19 shows the case where the target torque tT of the motor 1 is low, and there is consequently no limit to the torque limiter Tlp. Until a time ta, the rotor rotation speed V is less than the predetermined speed V0, and control is performed in the fixed mode. After the time ta, there is a change-over to current control by the estimation mode.

As the target torque tT is low and is not limited by the torque limiter Tlp, the torque command value To does not vary before and after the mode shift. The average torque in the fixed mode is less than that in the estimation mode when current control is performed according to the actual rotor phase, and the current map of the current amplitude l for the fixed mode is set so that a large current amplitude l is obtained taking account of this fact. Consequently, when there is a mode change and the current map which sets the current amplitude l changes over simultaneously, the current amplitude l decreases, the motor torque is maintained at the same value before and after the mode shift, and a sharp change of torque due to the mode shift is avoided. The current amplitude l varies according to the increase of the rotor rotation speed V, but this is omitted and not shown in the drawings to make the advantages of the invention clearer.

Figure 20:
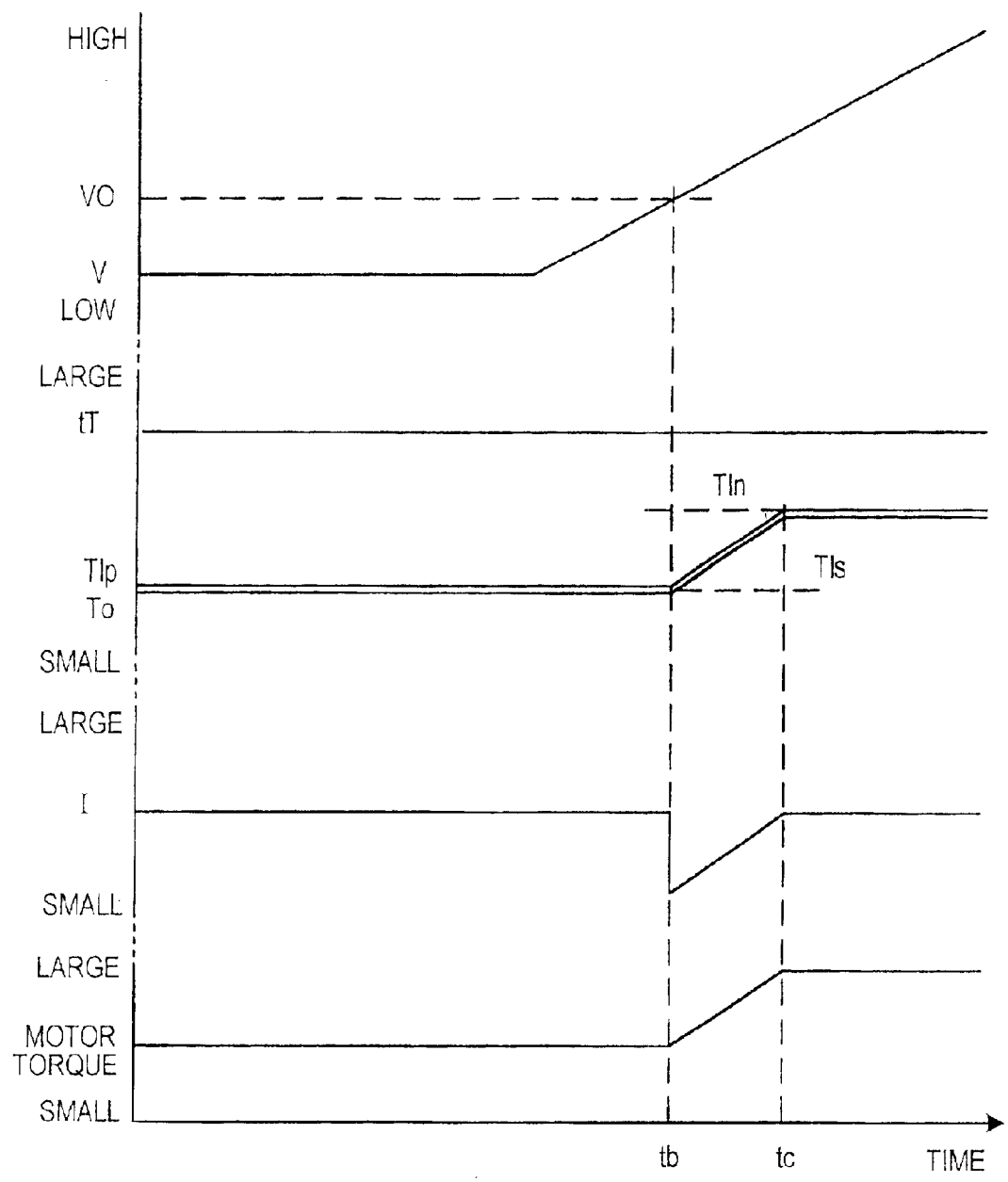
FIG. 20 is a time chart showing an operation when the control mode shifts to the estimation mode from the fixed mode.

FIG. 20 shows the case where the target torque tT is large and is limited by the torque limiter Tlp.

The target torque tT is larger than the torque limiter Tlp, so the torque command value To is the same value as the torque limiter Tlp. Herein, the torque limiter Tlp up to a time tb is set to the fixed mode torque limiter Tls, and after the time tb, it is set to the estimation mode torque limiter Tln. However, during the predetermined interval (tb–tc) immediately after mode shift, the torque limiter Tlp is made to vary gradually.

Until the time tb, the current amplitude l obtained by looking up the fixed mode current map according to the torque command value To (=Tls) is the maximum current amplitude of the inverter 5.

Immediately after there is a mode shift, the current amplitude l obtained by looking up the estimation mode current map according to the torque command value To (=Tls) is a value less than the maximum current amplitude of the inverter 5. Subsequently, it increases as the torque command value To gradually increases, and when the torque command value To is equal to the estimation mode torque limiter Tln at a time tc, it becomes the maximum current amplitude of the inverter 5.

Even if the current amplitude 1 is identical in the fixed mode and estimation mode, in the estimation mode, current control is performed according to the real rotor phase (or a phase close to the real rotor phase), and the motor torque becomes correspondingly larger. Therefore, although the motor torque increases after a mode shift, from the time tb to tc, the current amplitude 1 increases gradually, so there is no sharp change of motor torque due to the mode changeover.

Hence, regardless of the target torque, instantaneous fluctuation of the motor torque during a mode shift is prevented, and a sharp change of motor torque during a mode shift is therefore avoided.

As described above, in the third embodiment, when there is a shift from the fixed mode to the estimation mode, the current supplied to the motor 1 is controlled so that the motor torque is identical or varies gradually before and after the shift. Therefore, even if a low resolution, economical detection means is used for detecting the rotor phase, a sharp change of torque due to the mode shift can be avoided.

Next, a fourth embodiment will be described.

In the fourth embodiment, the current amplitude 1 is computed by a single current map (identical to the estimation mode current map of the third embodiment), and a sharp variation of motor torque when there is a mode shift is avoided by the setting of the torque command value To. The details of the control performed by the controller 3 are substantially identical to those of the third embodiment, so the description will focus on the parts that are different.

Figure 21:
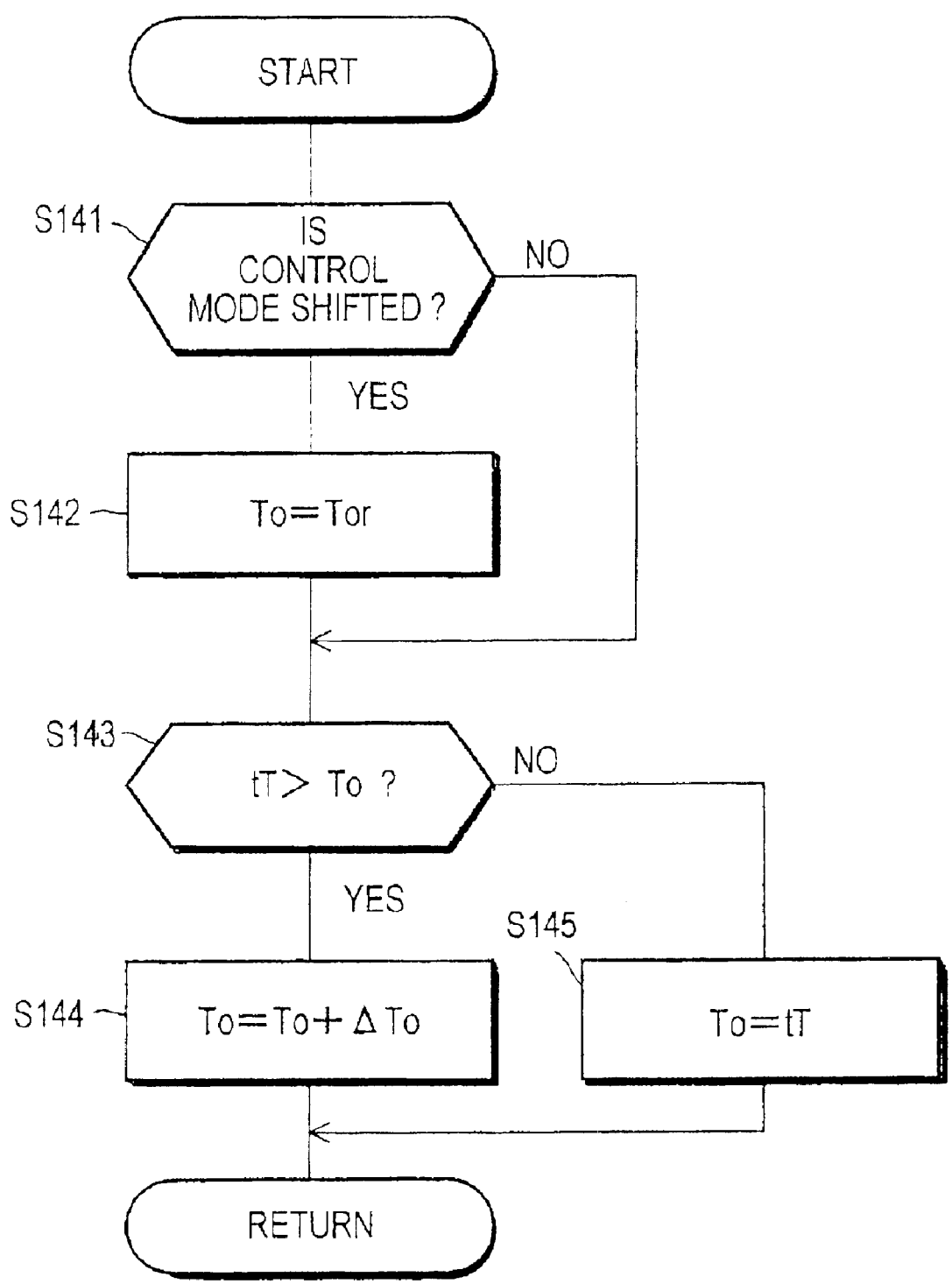
FIG. 21 shows a fourth embodiment, and is a flowchart of a torque command value computation subroutine.

FIG. 21 is a subroutine for computing the torque command value.

In a step S141, it is determined whether or not the current control mode shifted. Specifically, it is determined that there was a mode shift when the control mode on the immediately preceding occasion routine was executed is the fixed mode, and the present control mode is the estimation mode. When there was a mode shift, the routine proceeds to a step S142, and the torque command value To immediately after the mode shift is computed based on the target torque tT supplied from outside.

Figure 22:
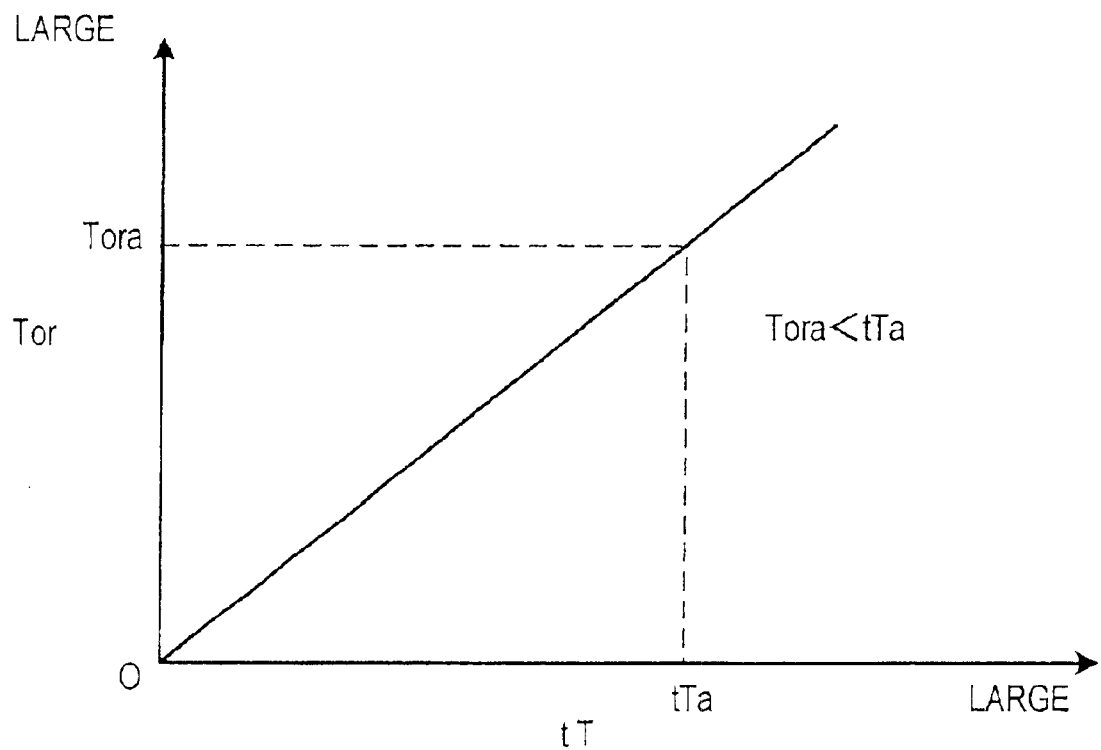
FIG. 22 is an initial torque computation table.

Specifically, a table shown in FIG. 22 is looked up, an initial torque Tor is computed based on the target torque tT, and the torque command value To is set to this initial torque Tor. The initial torque is a value obtained by applying a decrease correction to the target torque tT by the amount the torque decreases during fixed mode control. If for example Tora corresponds to tTa in the figure, Tora decreases less than tTa by the torque decrease amount during fixed mode control.

In a step S143, it is determined whether or not the torque command value To is less than the target torque tT. When the torque command value To is less than the target torque tT, the routine proceeds to a step S144, and a predetermined addition value ΔTo is added to the present torque command value To to compute a new torque command value To. Conversely, when it is determined that the present torque command value To is higher than the target torque tT, the routine proceeds to a step S145, and a new torque command value To is set to the target torque tT.

Due to the above processing, when there is a shift from the fixed mode to the estimation mode, the torque command value temporarily decreases to the initial torque Tor, and then it gradually approaches the target torque tT.

Figure 23:
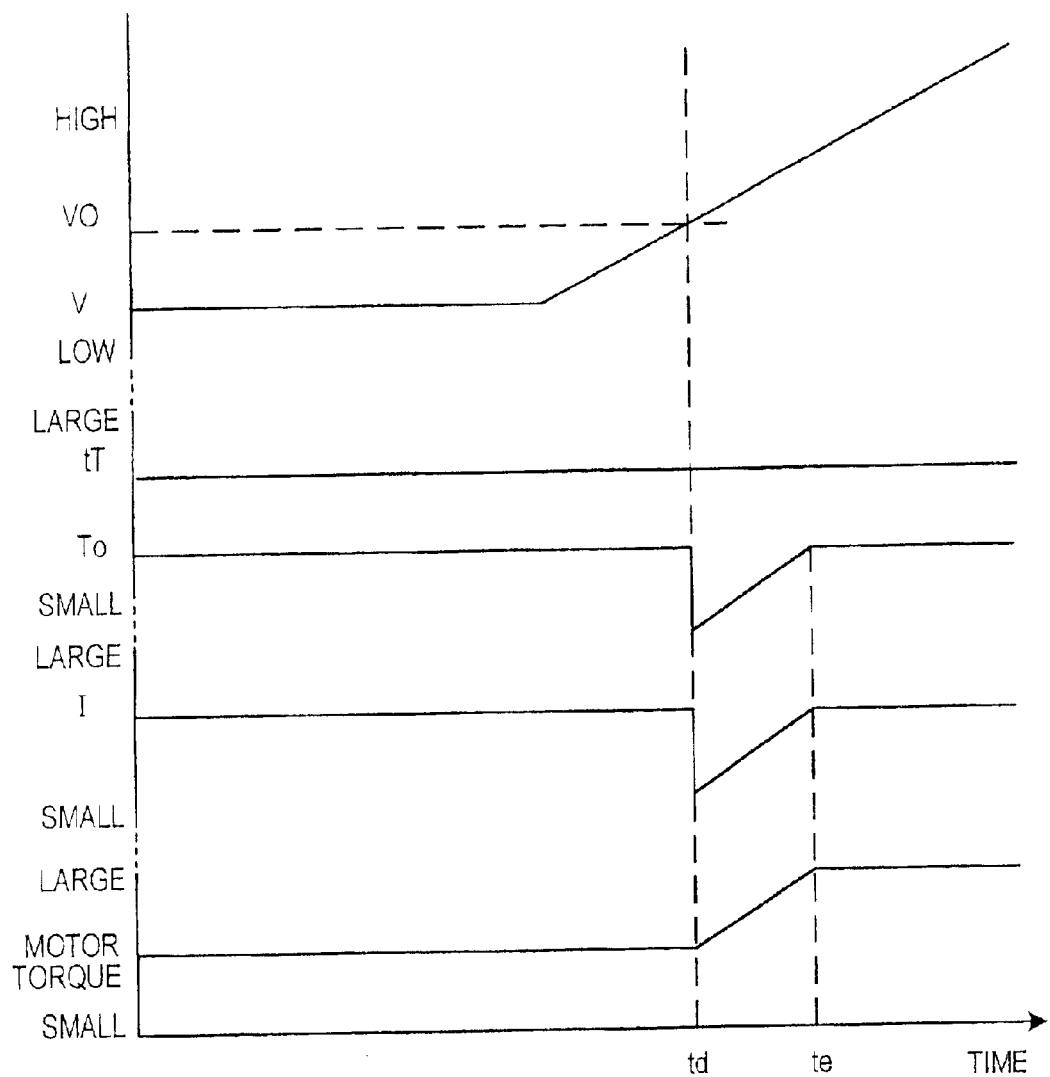
FIG. 23 is a time chart showing an operation when the control mode shifts to the estimation mode from the fixed mode.

The operation when the control mode of the motor 1 is shifted from the fixed mode to the estimation mode will now be described referring to the time chart of FIG. 23.

At a time td, there is a shift from the fixed mode to the estimation mode. According to the fourth embodiment, the current amplitude 1 is computed using a single current map, the current amplitude 1 varies in the same way as the variation of the torque command value To, i.e., it temporarily decreases at the time td, and then gradually increases to a time te. Specifically, by varying the torque command value set from the target torque with a shift of control mode, the current characteristics supplied to the motor 1 can be changed over without changing over the control current map.

Further, even if the current amplitude 1 is the same in the fixed mode and estimation mode, the generated torque is larger during estimation mode control, but as the current amplitude 1 gradually increases from the time td to the time te, rapid variation of the motor torque when there is a mode transition is avoided.

The entire contents of Japanese Patent Applications P2001-186223 (filed Jun. 20, 2001) and P2001-187580 (filed Jun. 21, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A control device for controlling current supplied to a motor, comprising:
   a phase sensor which detects a rotor phase of the motor at a predetermined angular resolution, and outputs a phase signal corresponding to plural phase determination ranges,
   a drive device which drives the motor, and
   a controller functioning to:
      select one method from plural methods for determining a current control rotor phase from the phase signal,
      determine the current control rotor phase from the phase signals using the selected method,
      compute a command value of the current supplied to the motor using the determined current control rotor phase, and
      output the command value of the current to the drive device.

2. The control device as defined in claim 1, wherein the controller further functions to:
   select a first rotor phase determining method when the rotor rotation speed of the motor is less than a predetermined speed and the torque of the motor is larger than a predetermined torque, and
   vary the current control rotor phase within the phase determination range where the rotor phase is determined to be from the phase signal, when the first rotor phase determining method is selected.

3. The control device as defined in claim 2, wherein the controller further functions to:
   vary the current control rotor phase from the minimum rotor phase to the maximum rotor phase in the phase determination range where the rotor phase is determined to be from the phase signal.

4. The control device as defined in claim 3, wherein the controller further functions to:

make the variation speed of the current control rotor phase smaller, the longer the state where the rotor rotation speed is less than a predetermined speed and the motor torque is larger than the predetermined torque continues.

5. The control device as defined in claim 4, wherein the fixed rotor position is an intermediate position in the phase determination range where the rotor phase is determined to be from the phase signal.

6. The control device as defined in claim 1, wherein the controller further functions to:

select a second rotor phase determining method when the rotor rotation speed is less than a predetermined speed and the motor torque is less than a predetermined torque, and set the current control rotor phase at a predetermined fixed rotor phase within the phase determination range where the rotor phase is determined to be from the phase signal, when the second rotor phase determining method is selected.

7. The control device as defined in claim 1, wherein the controller further functions to:

select a third rotor phase determining method when the rotor rotation speed is larger than the predetermined speed, and when the third rotor phase determining method is selected, estimate the present rotor phase based on an elapsed time from when the phase signal varied to the present time, the rotor rotation speed and the minimum rotor phase of the phase determination range where the rotor phase is determined to be from the phase signal, and set the current control rotor phase at the estimated rotor phase.

8. The control device as defined in claim 7, wherein the controller further functions to:

select a second rotor phase determining method when the rotor rotation speed is less than the predetermined speed, and when the second rotor phase determining method is selected, set the current control rotor phase at a predetermined fixed rotor phase in the phase determination range where the rotor phase is determined to be from the phase signal.

9. The control device as defined in claim 8, wherein the controller further functions to:

compute a command value of the motor supply current such that the motor supply current when the fixed rotor phase is used is larger than the motor supply current when the estimated rotor phase is used.

10. The control device as defined in claim 8, wherein the controller further functions to:

correct a command value of the motor supply current computed using the estimated rotor phase in the decrease direction when the rotor phase determining method is changed over from the second method to the third method.

11. The control device as defined in claim 10, wherein the controller further functions to:

make the correction amount of the motor supply current command value to be smaller, the longer the elapsed time from the change-over of the rotor phase determining method becomes.

12. The control device as defined in claim 1, wherein the drive device drives the motor in accordance with the command value of the current.

13. A method for controlling the current supplied to a motor, comprising:

detecting a signal from a phase sensor, wherein the phase sensor detects a rotor phase of the motor at a predetermined angular resolution and outputs a phase signal corresponding to plural phase determination ranges, selecting one method from plural different methods which determine a current control rotor phase from the phase signal, determining the current control rotor phase from the phase signal using the selected method, computing a command value of the current supplied to the motor using the determined current control rotor phase, and controlling the current supplied to the motor based on the command value of the current.

14. The method as defined in claim 13, comprising:

selecting a first rotor phase determining method when the rotor rotation speed of the motor is less than a predetermined speed and the torque of the motor is larger than a predetermined torque, and varying the current control rotor phase within the phase determination range where the rotor phase is determined to be from the phase signal when the first rotor phase determining method is selected.

15. The method as defined in claim 13, comprising:

selecting a second rotor phase determining method when the rotor rotation speed is less than a predetermined speed and the torque of the motor is less than a predetermined torque, and setting the current control rotor phase at a fixed predetermined rotor phase within the phase determination range where the rotor phase is determined to be, when the second rotor phase determining method is selected.

16. The method as defined in claim 13, wherein the motor is driven in accordance with the current supplied to the motor based on the command value of the current.

17. A control device for controlling current supplied to a motor, comprising:

means for detecting a rotor phase of the motor at a predetermined angular resolution, and outputs a phase signal corresponding to plural phase determination ranges, driving means for driving the motor, mean for selecting one method from plural methods for determining a current control rotor phase from the phase signal, means for determining the current control rotor phase from the phase signals using the selected method, means for computing a command value of the current supplied to the motor using the determined current control rotor phase, and means for outputting the command value of the current to the driving means.

18. The control device as defined in claim 17 wherein the driving means drives the motor according to the command value of the current.

* * * * *